(12) United States Patent
Huang et al.

(10) Patent No.: US 12,483,590 B2
(45) Date of Patent: Nov. 25, 2025

(54) METHODS AND APPARATUS TO VISUALIZE MACHINE LEARNING BASED MALWARE CLASSIFICATION

(71) Applicant: McAfee, LLC, San Jose, CA (US)

(72) Inventors: Yonghong Huang, Hillsboro, OR (US); Steven Grobman, Plano, TX (US); Jonathan King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 295 days.

(21) Appl. No.: 17/714,023

(22) Filed: Apr. 5, 2022

(65) Prior Publication Data

US 2022/0321579 A1    Oct. 6, 2022

Related U.S. Application Data

(60) Provisional application No. 63/170,650, filed on Apr. 5, 2021.

(51) Int. Cl.
    *H04L 9/40*      (2022.01)
    *H04L 41/16*      (2022.01)

(52) U.S. Cl.
    CPC ........... *H04L 63/145* (2013.01); *H04L 41/16* (2013.01); *H04L 63/20* (2013.01); *H04L 63/0227* (2013.01); *H04L 63/1408* (2013.01)

(58) Field of Classification Search
    CPC ..... H04L 41/16; H04L 63/02; H04L 63/0227; H04L 63/14; H04L 63/1408; H04L 63/1441; H04L 63/145; H04L 63/20
See application file for complete search history.

(56) References Cited

U.S. PATENT DOCUMENTS

| | | | |
|---|---|---|---|
| 11,710,034 B2 * | 7/2023 | Anderson | G06F 16/901 706/12 |
| 2015/0295945 A1 * | 10/2015 | Canzanese, Jr. | G06F 21/55 726/23 |
| 2018/0083903 A1 * | 3/2018 | El-Alfy | G06N 20/10 |
| 2018/0122508 A1 * | 5/2018 | Wilde | G16H 50/20 |
| 2020/0301955 A1 * | 9/2020 | Ludlow | G06F 16/285 |
| 2021/0110288 A1 * | 4/2021 | Poothiyot | G06F 8/20 |

(Continued)

OTHER PUBLICATIONS

Selvaraju, R., et al., Grad-CAM: Visual Explanations from Deep Networks via Gradient-based Localization, 2017, Proceedings of the IEEE International Conferenceon Computer Vision, p. 618-626. (Year: 2017).*

(Continued)

*Primary Examiner* — D'Arcy Winston Straub
(74) *Attorney, Agent, or Firm* — Hanley, Flight & Zimmerman, LLC

(57) ABSTRACT

Methods, apparatus, systems, and articles of manufacture are disclosed. An example apparatus includes at least one memory, instructions, and processor circuitry to execute the instructions. The processor circuitry executes the instructions to identify a test data distribution, generate a first visualization of the identified test data distribution, select a visualization type for a machine learning model, generate a second visualization including an indication of features extracted from the test data by the machine learning model, and generate a third visualization of results of inference performed by the machine learning model, the inference performed on the test data.

15 Claims, 23 Drawing Sheets

(56) References Cited

U.S. PATENT DOCUMENTS

2022/0067580 A1* 3/2022 Rho .................. G06F 9/451
2022/0094709 A1* 3/2022 Sharma ............... G06F 18/2415

OTHER PUBLICATIONS

Lundberg et al., "Explainable IA for Trees: From Local Explanations to Global Understanding", University of Washington, May 11, 2019, 72 pages. (Retrieved from: https://arxiv.org/pdf/1905.04610.pdf on Apr. 5, 2022).

Selvaraju et al., "Grad-CAM: Visual Explanations from Deep Networks via Gradient-based Localization", Georgia Institute of Technology, Dec. 3, 2019, 23 pages. (Retrieved from: https://arxiv.org/pdf/1610.02391.pdf on Apr. 5, 2022).

Maaten et al., "Visualizing Data using t-SNE", Journal of Machine Learning Research 9 (2008) 2579-2605, Published Nov. 8, 2008, 27 pages (Retrieved from: https://www.jmlr.org/papers/volume9/vandermaaten08a/vandermaaten08a.pdf?fbclid=IwA on Apr. 5, 2022).

* cited by examiner

500 ↓

| INDEX | SAMPLE | FILE TYPE | CLASSIFICATION SCORE |
|---|---|---|---|
| 0 | F4350385B4E119A0F906AC6E71C987E4 | VC | -0.630311 |
| 1 | AA995018210438EF4DD44F73F580E0BD | VB | -3.247108 |
| 2 | D333BAE2C45F3431BEFD7A88F1DA540 | PE | 2.526290 |
| 3 | A52719F8F9BF3DA7DC776F3719E063EC | VB | -2.593794 |

504

502 ↓

| FILETYPE | THRESHOLD | | |
|---|---|---|---|
| | LOW SENSITIVITY | MEDIUM SENSITIVITY | HIGH SENSITIVITY |
| PE | 4.580455 | 2.725218 | 1.223103 |
| DOTNET | 4.305524 | 4.148103 | 1.070097 |
| VC | 4.564929 | 3.904639 | 0.498931 |
| VB | 3.1315132 | 2.657565 | 1.460789 |
| DELPHI | 2.89397 | 2.620233 | 1.205439 |
| UPX | 3.09339 | 2.780571 | 1.385452 |

FIG. 5

FIRST MODEL 700

SECOND MODEL 702

METHODS AND APPARATUS TO VISUALIZE MACHINE LEARNING BASED MALWARE CLASSIFICATION

RELATED APPLICATION

This patent claims the benefit of U.S. Provisional Patent Application No. 63/170,650, which was filed on Apr. 5, 2021. U.S. Provisional Patent Application No. 63/170,650 is hereby incorporated herein by reference in its entirety. Priority to U.S. Provisional Patent Application No. 63/170,650 is hereby claimed.

FIELD OF THE DISCLOSURE

This disclosure relates generally to machine learning and, more particularly, to methods and apparatus to visualize machine learning based malware classification.

BACKGROUND

Machine learning is a subfield of artificial intelligence. In machine learning, instead of providing explicit instructions, programmers use a trained machine learning model and supply data to the model. The model generates predictions and, in some examples, trains itself to improve prediction accuracy. Programmers can also adjust model parameters to further improve prediction accuracy.

BRIEF DESCRIPTION OF THE DRAWINGS

FIG. 5 illustrates example tables and data associated with example malware classification misses and example model sensitivity thresholds.

Figure 1:
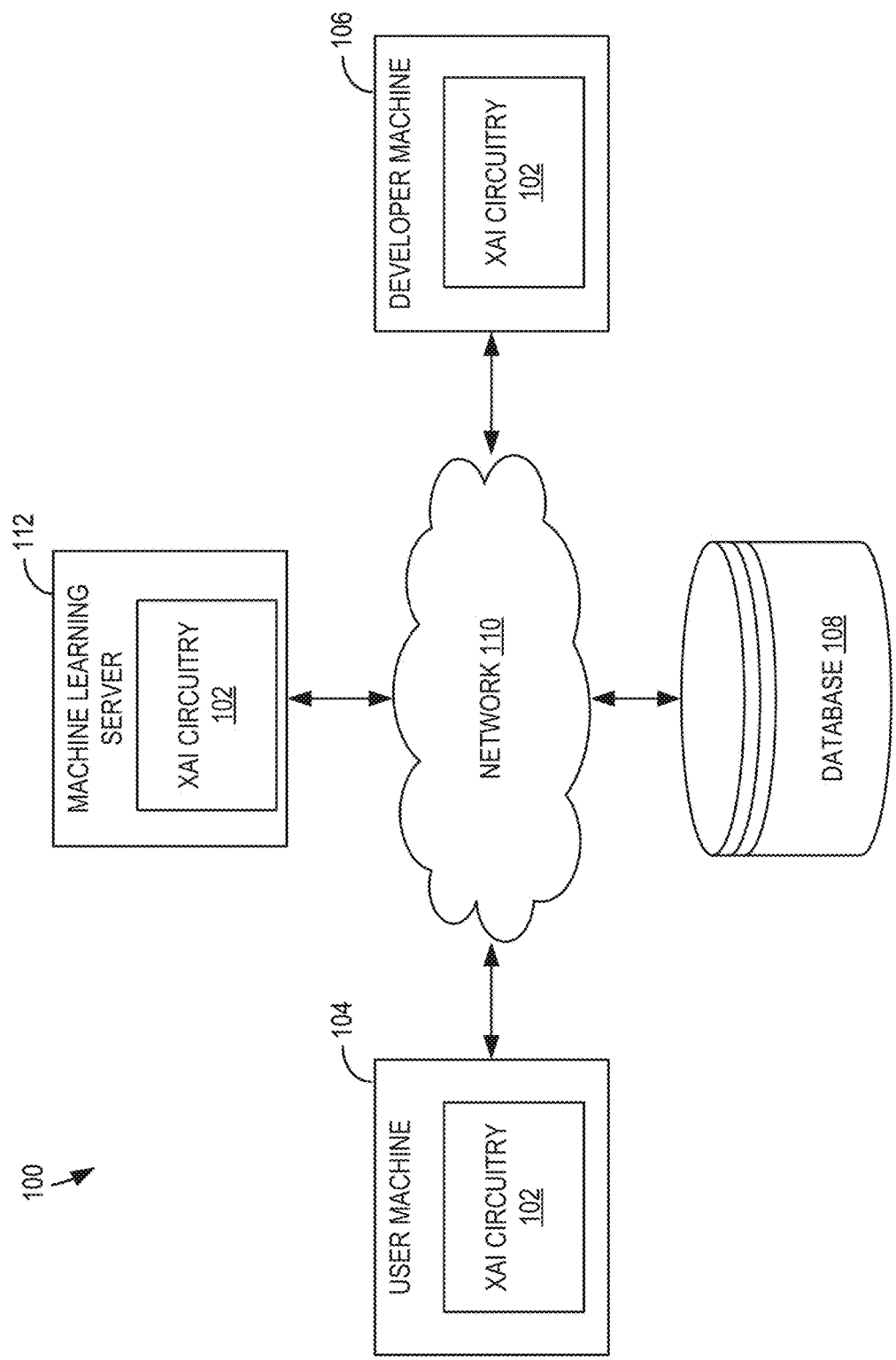
FIG. 1 is an illustration of an example computing environment to visualize machine learning based malware classification.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Malware is malicious software designed to harm or exploit a programmable device or network. Malware can steal private information, hijack devices, and cause significant disruptions to computer systems. Accordingly, detection and removal of malware is of intense industrial interest.

Artificial intelligence (AI) and machine learning (ML) techniques may be used to classify an input (e.g., a file, data, etc.) as corresponding to one or more categories. In this manner, AI and ML techniques may be applied to malware detection and provide improved accuracy compared to rule-based detection techniques. Yet, significant technical challenges arise when applying ML models to malware detection. For example, it may be challenging for researchers to troubleshoot ML model discrepancies and/or address misclassifications. ML-based systems often include models with a large number (e.g., thousands, millions) of rapidly changing weights. The rate and scale of such changes may render direct analysis impractical. Furthermore, users may have difficulty understanding and evaluating why a model makes a specific classification.

Explainable AI (XAI) is artificial intelligence in which the results (e.g., ML model classification of malware) produced by the AI can be understood by humans. Examples disclosed herein may include XAI visualizations to help researchers and users understand and interpret predictions made by machine learning models. Example XAI visualizations disclosed herein are applicable to a wide variety of ML algorithms, and generate visualizations for at least three portions of a ML pipeline (e.g., pre-process, in-process, post-process). Examples disclosed herein provide an end-to-end framework for identifying a root cause of misclassification errors, understanding the errors, and troubleshooting the errors.

Some examples include XAI visualizations for antivirus test misses, customer escalations, ML model development, ML model comparisons, and ML model improvement. Some examples include a visual explanation framework to provide visual explanations for error analysis in a machine learning pipeline on malware classification. In some examples, the framework consists of pre-processing visualizations, in-processing visualizations, and post-processing visualizations.

FIG. 1 is an illustration of an example computing environment 100 to visualize machine-learning based malware classification. The computing environment 100 includes example XAI circuitry 102, an example user machine 104, an example developer machine 106, an example database 108, an example network 110, and an example machine learning server 112.

The example XAI circuitry 102 provides visualizations of a ML pipeline for machine learning based malware detection. The XAI circuitry 102 provides visualizations of the ML pipeline at various stages of the ML pipeline including: a pre-processing stage, an in-processing stage, and a post-processing stage. Additionally, the XAI circuitry 102 can analyze information from each stage of the ML pipeline and combine the information from one or more stages to generate a pipeline-level visualization. In the example of FIG. 1, a separate instance of the XAI circuitry 102 is included in each of the user machine 104, the developer machine 106, and the machine learning server 112. However, in some examples the XAI circuitry 102 may not be included in one or more of the user machine 104, the developer machine 106, and/or the machine learning server 112.

In some examples, the user machine 104 may include XAI circuitry 102 and communicate with the machine learning server 112. In turn, the machine learning server 112 may provide a trained machine learning model to the user machine 104 for inference (e.g., malware classification). The example XAI circuitry 102 performs visualizations on the trained machine learning model as it moves through a pipeline associated with the user machine 104. The example XAI circuitry 102 is described further in association with FIG. 2.

The example user machine 104 is a user machine that includes malware detection software. The example user machine 104 includes a first instance of the example XAI circuitry 102. For example, the user machine 104 may include malware detection software that further includes a machine learning pipeline with pre-processing, in-processing, and post-processing phases. The XAI circuitry 102 of the user machine 104 may present a visualization of a trained machine learning model and/or a visualization of features extracted from a test data set, wherein the test data set is used as input to the machine learning model. The user machine 104 may additionally generate recommendations and/or malware classification results. In some examples, the user machine 104 may communicate with the database 108 to retrieve training data or store classification results, for example.

The example developer machine 106 may be associated with a malware detection researcher, for example. The XAI circuitry 102 of the developer machine 106 may therefore provide recommendations and visualizations that are relevant to the researcher. For example, the second instantiation of the XAI circuitry 102 (e.g., of the developer machine 106) may generate additional and/or more detailed visualizations and analyses than the first instantiation of the example XAI circuitry 102 of the user machine 104. The example developer machine 106 may additionally request resources from the machine learning server 112 and retrieve and/or store information from the example database 108.

Figure 2:
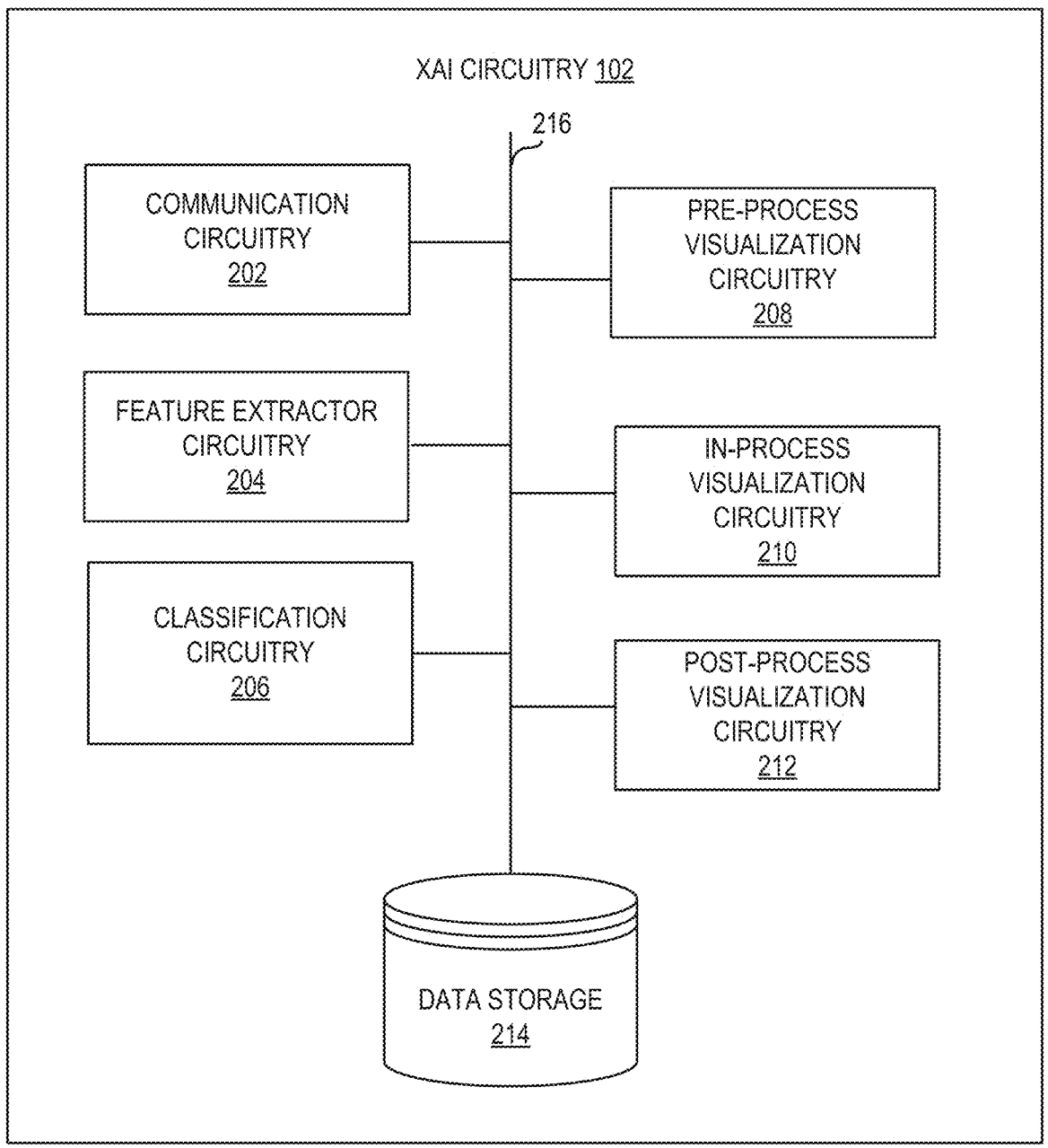
FIG. 2 is a block diagram of example explainable artificial intelligence circuitry of FIG. 1.

The example machine learning server 112 includes a third instantiation of the example XAI circuitry 102 of FIG. 2. The machine learning server 112 may be a dedicated machine learning server including AI accelerator application-specific integrated circuits (ASICs), graphical processing units (GPUs), etc. In some examples, the machine learning server may be a cloud resource providing on-demand availability of computer resources. Thus, the machine learning server may support functions of the user machine 104 and/or the developer machine 106. The example machine learning server 112 may coordinate with the example database 108 to load and/or store data. For example the machine learning server 112 may retrieve a first set of samples of known malware, a second set of samples that are known not to contain malware, and other information associated with either the first or the second set of samples. Such information can be used in a machine learning pipeline that is associated with the XAI circuitry 102.

The network 110 facilitates communication between the user machine 104, the machine learning server 112, the developer machine 106, and the database 108. The network 110 may be, for example, the Internet. In some examples, the network 110 may be a local area network.

FIG. 2 is a block diagram of the example XAI circuitry 102 of FIG. 1 to visualize machine-learning based malware classification. The XAI circuitry 102 of FIG. 2 may be instantiated (e.g., creating an instance of, bring into being for any length of time, materialize, implement, etc.) by processor circuitry such as a central processing unit executing instructions. Additionally or alternatively, the XAI circuitry 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example XAI circuitry 102 includes example communication circuitry 202, example feature extractor circuitry 204, example classification circuitry 206, example pre-process visualization circuitry 208, example in-process visualization circuitry 210, example post-process visualization circuitry 212, example data storage 214, and a bus 216.

The example XAI circuitry 102 of FIG. 2 includes the example communication circuitry 202. The communication circuitry 202 transmits and/or receives information from an example machine learning pipeline. For example, the machine learning pipeline may include the feature extractor circuitry 204, the example classification circuitry 206, test data stored in the example data storage 214, and results data stored in the data storage 214. The example communication circuitry 202 may therefore coordinate communication between the feature extractor circuitry 204 and the classification circuitry 206. In some examples, the communication circuitry 202 may also communicate with separate machines (e.g., a cloud server, another network-connected computer, etc.). In the example of FIG. 2, the machine learning pipeline is included within the example XAI circuitry 102. In some examples, the machine learning pipeline may be located outside the example XAI circuitry 102 and the machine learning pipeline may communicate with the XAI circuitry via the communication circuitry 202.

The example feature extractor circuitry 204 is part of a machine learning pipeline that may reduce the number of features in a dataset by creating new features from existing features and discarding the existing features. The reduced set of features summarizes the features the original dataset. A reduced number of features can be provided to any of the visualization circuitries 208-212 and provide more understandable and/or effective visualizations than visualizations of higher dimensionality. The reduced set of features may also improve training speed. Data from the example feature extractor circuitry 204 may be provided to the example classification circuitry 206.

The example classification circuitry 206 predicts a class label for a given example input data. For example, the classification circuitry 206 may be provided a file, and classify that file as either malware or non-malware (e.g., benign). The example classification circuitry 206 may be a machine learning model and/or any other classification algorithm (e.g., logistic regression, naive bayes, k-nearest neighbors, decision tree, support vector machine).

Figure 7:
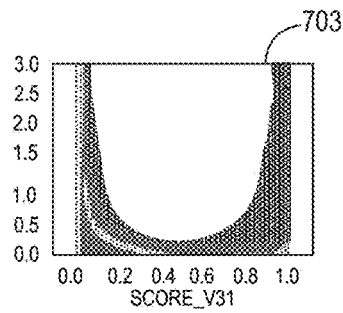
FIG. 7 is an example pre-process visualization for distributions of six file types for first and second machine learning models.
Figure 7:
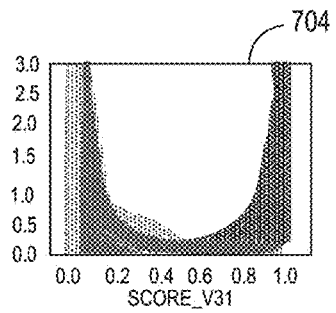
Figure 7:
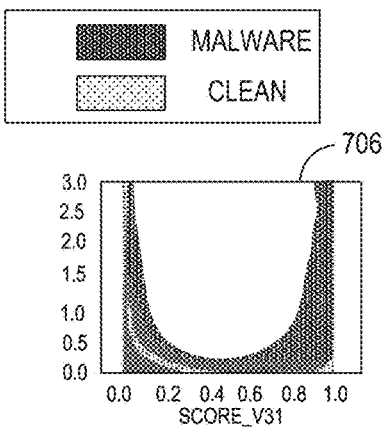
Figure 7:
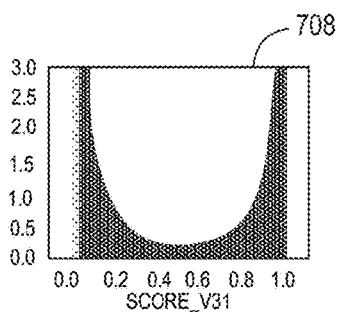
Figure 7:
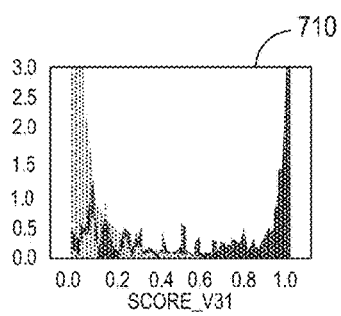
Figure 7:
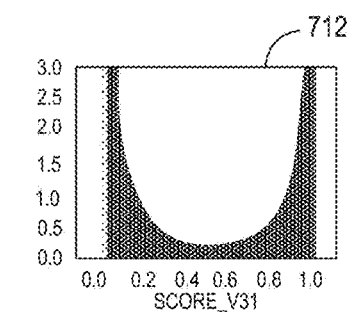
Figure 7:
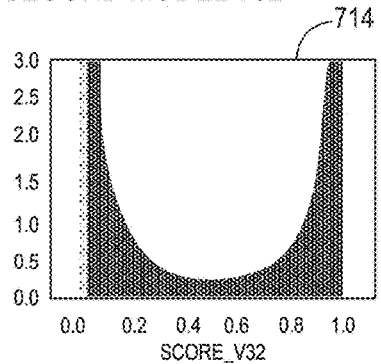
Figure 7:
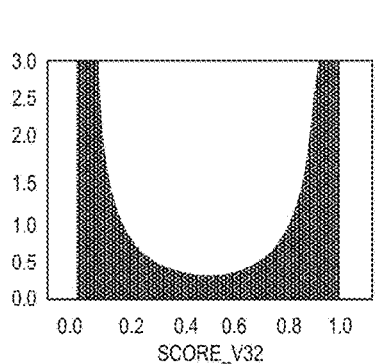
Figure 7:
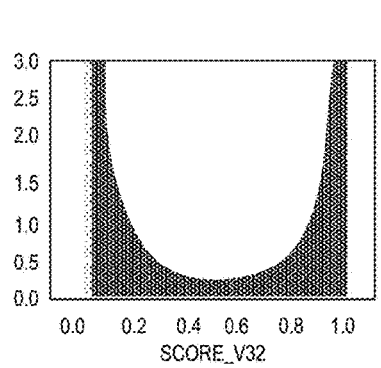
Figure 7:
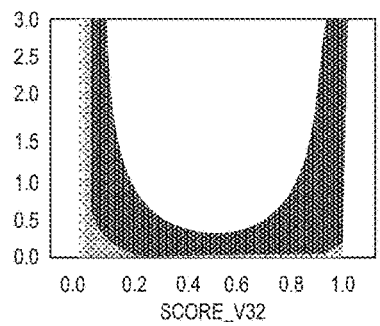
Figure 7:
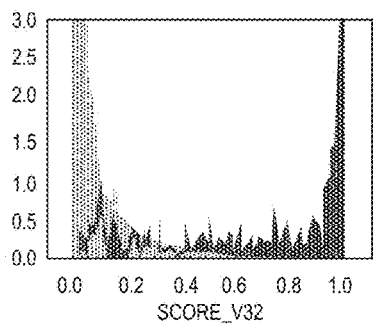
Figure 7:
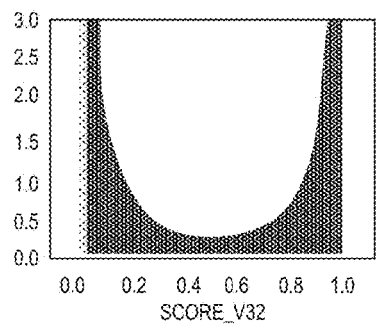
Figure 12:
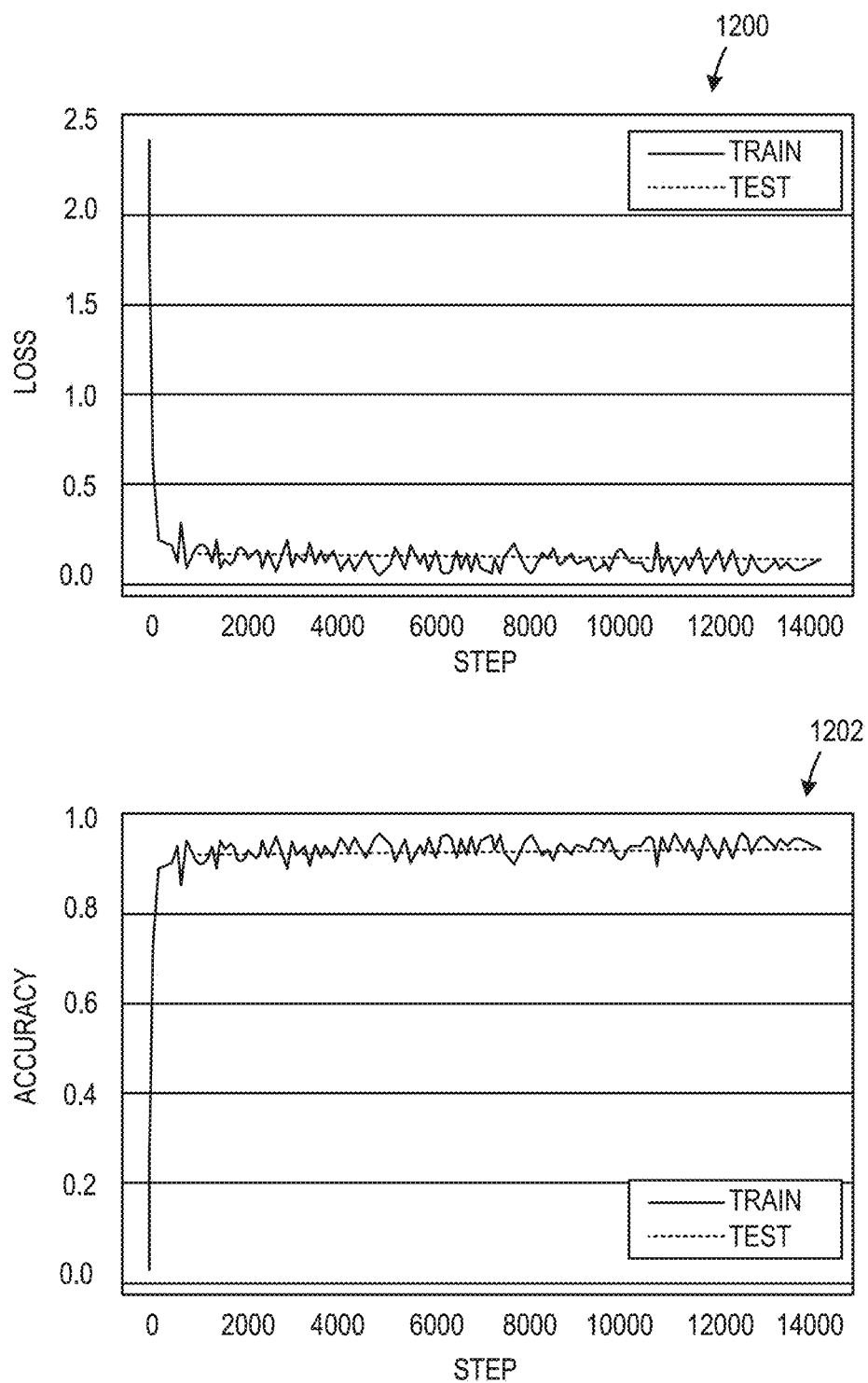
FIG. 12 shows an in-process visualization including two learning curves.

The example pre-process visualization circuitry 208 provides a pre-processing first visualization. In some examples, the first visualization is a first visualization of a distribution of test data. For example, the pre-process visualization may include a pre-processing visualization of a distribution of malware data. The example pre-process visualization circuitry 208 analyzes test data to help a user understand test data distributions. In some examples, a pre-process visualization can be presented in combination with a post-process visualization. By presenting the pre-process visualization and the post-process visualization, errors that have a root cause in the test data can be determined. In some examples, a pre-process visualization for a malware detection model may include at least two graphs illustrating differences in test data distribution (e.g., malware vs. benign) for different file types. An example pre-process visualization performed by the pre-process visualization circuitry is illustrated in FIG. 7. Another example pre-process visualization is shown in FIG. 12.

The example in-process visualization circuitry 210 generates model-based XAI visualizations that show feature importance in classification. In some examples, algorithms such as shapley additive explanations (SHAP) and gradient-weighted class activation mapping (Grad-CAM) may be used to prepare visualizations. The example in-process visualization circuitry 210 also can visualize feature projections carried out by t-distributed stochastic neighbor embedding (t-SNE), principal component analysis (PCA) or other methods.

Thus, the example in-process visualization circuitry 210 may base visualizations (e.g., feature importance visualizations) on algorithms such as SHAP and/or Grad-CAM that visualize the relationship between feature importance (e.g., feature ranking) and model decision making. Such visualizations provide model interpretability information and visualize how a ML model makes decisions in feature/embedding space. The visualization circuitry 210 may help a user understand class similarity for high dimensionality data (e.g., through dimensionality reduction).

Figure 4:
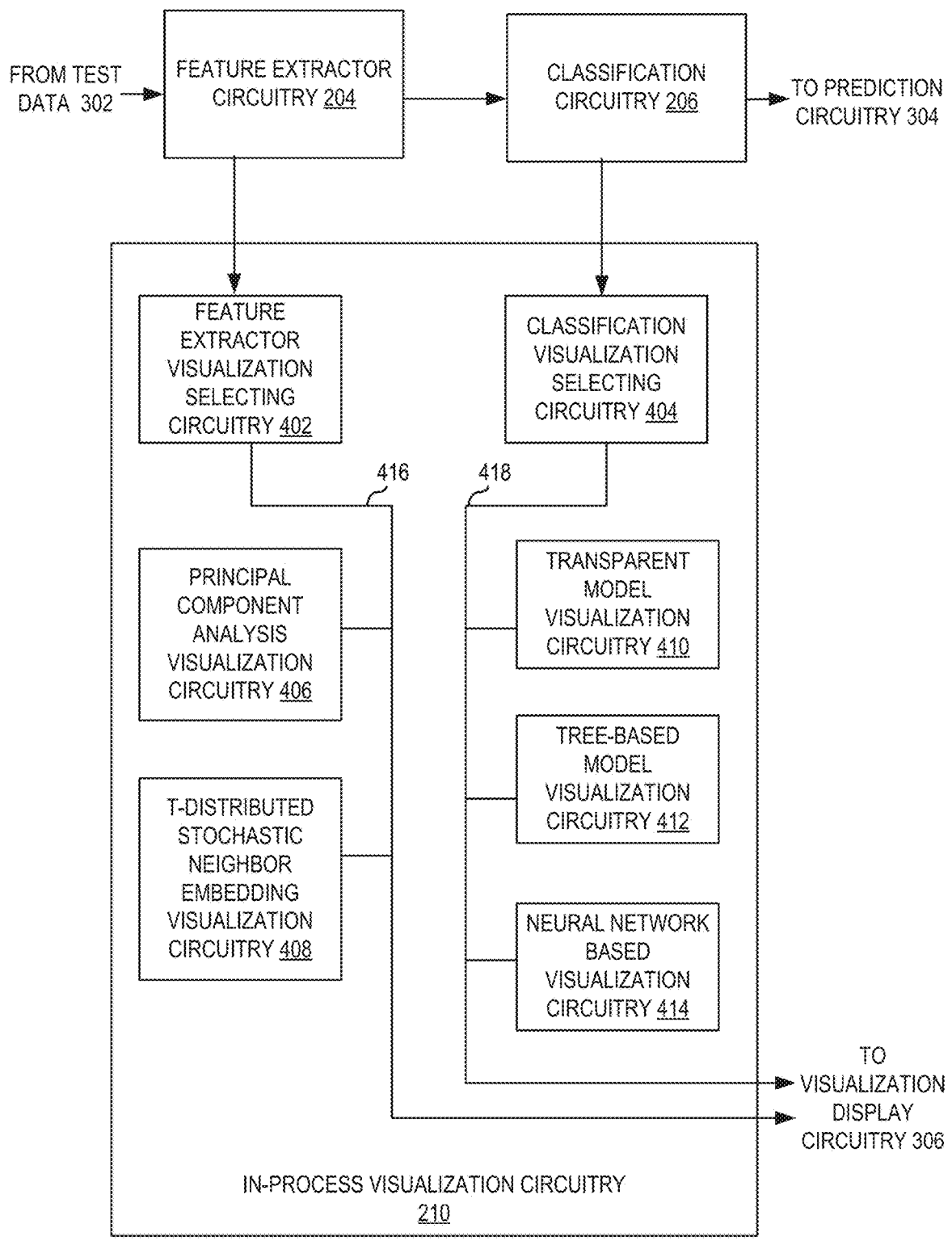
FIG. 4 is a block diagram of example in-process visualization circuitry of FIG. 2.

As shown in FIG. 4, the example in-process visualization circuitry selects different visualizations for different ML models. For example, in-process visualization circuitry 210 may base a visualization for tree-based models (e.g., random forests) on SHAP. Tree-based model visualizations may also use the XGboot, and lightGBM algorithms. In some examples, neural network (NN) based models (e.g., convolutional NNs and recurrent NNs) may base a visualization on a gradient-weighted class Activation Mapping (Grad-CAM), as will be described further in association with FIG. 4.

The example post-process visualization circuitry 212 is another XAI tool that can provide data scientists insights into model comparisons and test data quality. In some examples, the post-process visualization circuitry 212 visualizes the results of a ML pipeline and provides visualizations of efficacy evaluation metrics. The example post-process visualization circuitry 212 may generate visualizations that include area under receiver operating characteristic curve (ROC) and partial area under receiver operating characteristic curve (pAUC). The pAUC summarizes a portion of the ROC curve over a specified interval of interest and can provide actionable results in examples where a ROC comparison between two models does not produce adequate results. Such visualizations can help security researchers can troubleshoot classification errors.

Figure 10:
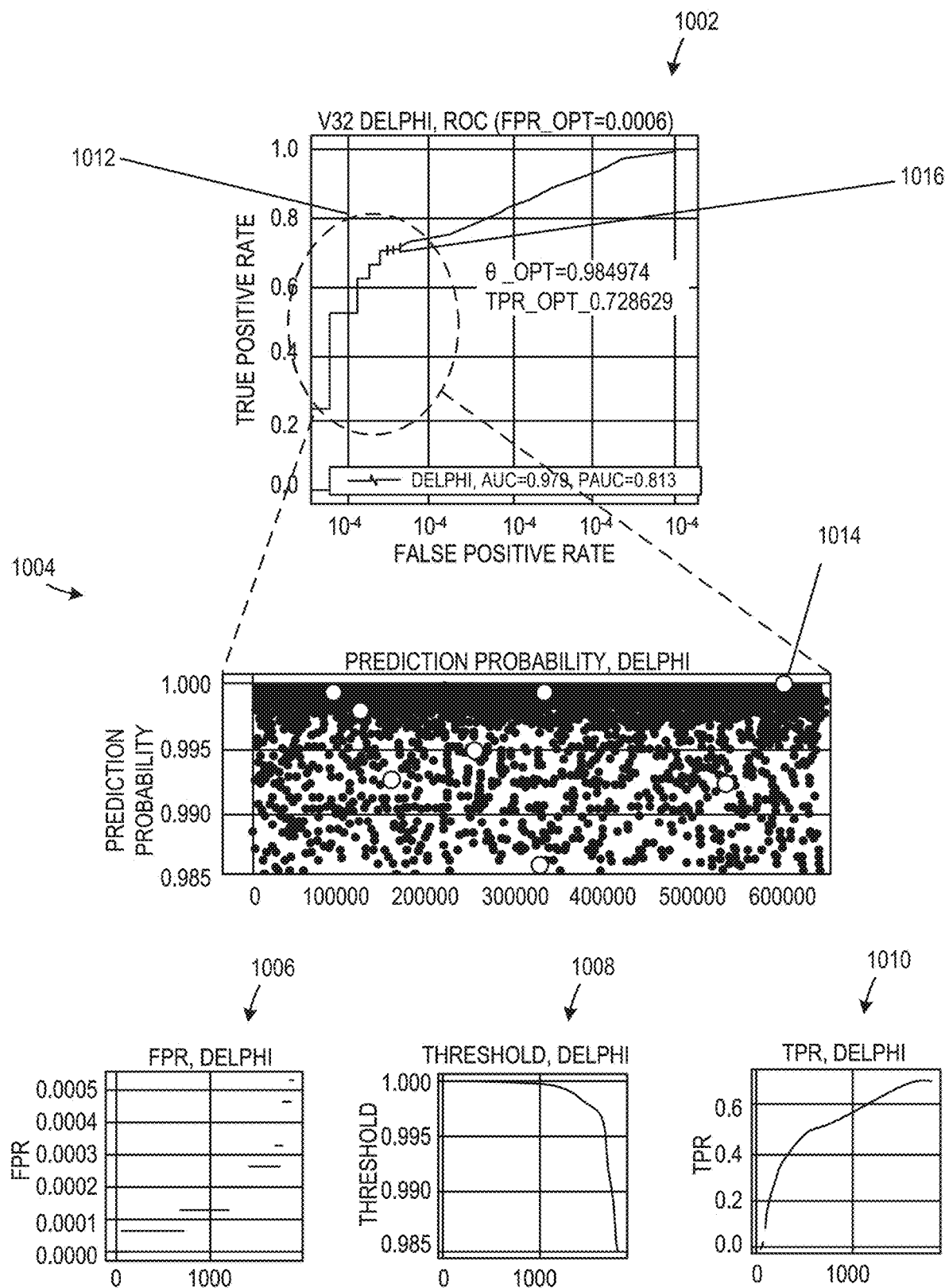
FIG. 10 is an illustration of an example post-processing visualization.
Figure 14:
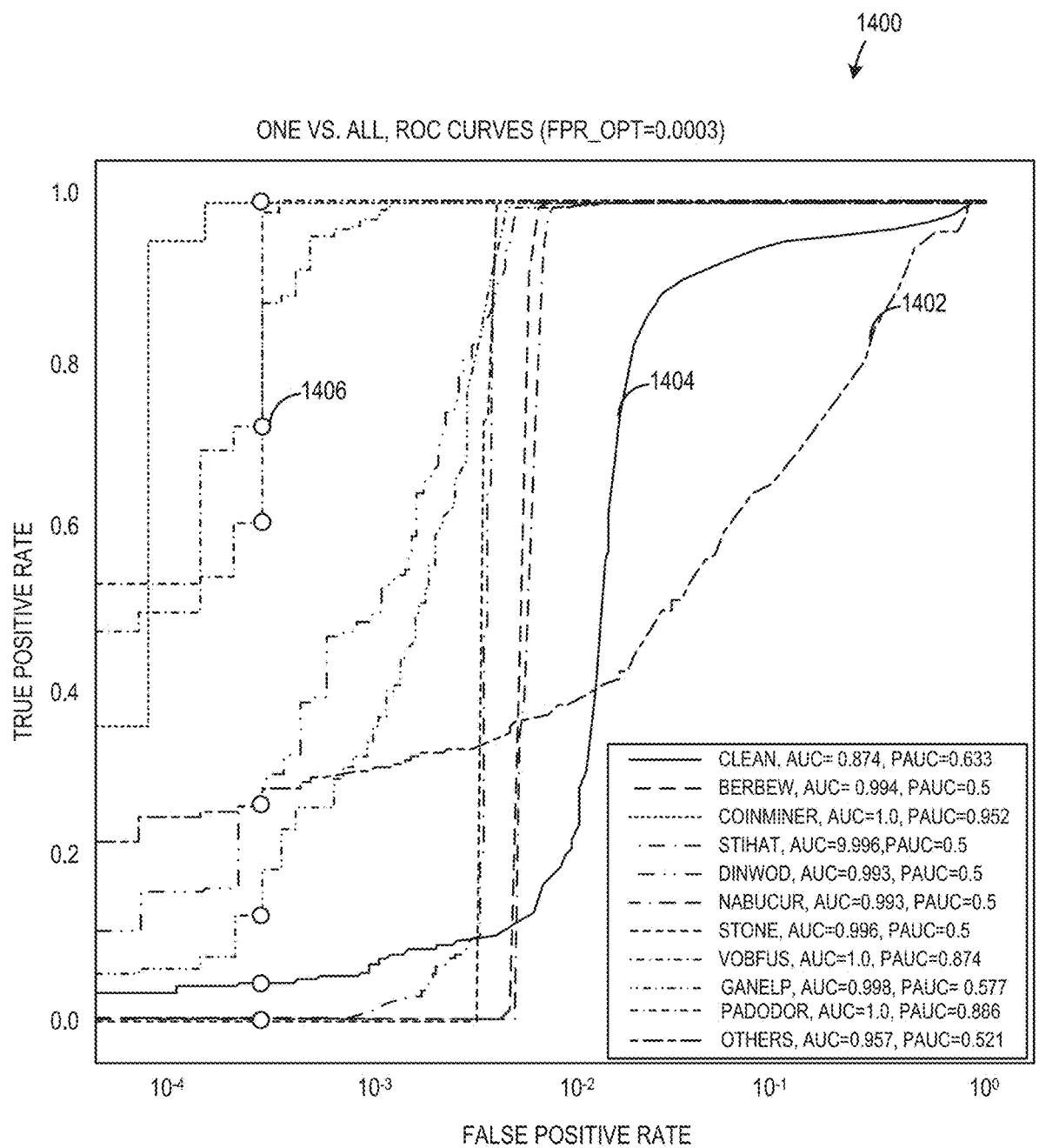
FIG. 14 is an example post-process visualization including receiver operating characteristic curves for convolutional neural networks associated with various malware families.

The example post-process visualization circuitry 212 generates pAUCs, operation points on ROCs, and provides visual explanations of how the ROCs are constructed. For example, the post-process visualization circuitry 212 can associate points on ROC curves with associated test samples, which can help security researchers troubleshoot classification errors. The example post-process visualization circuitry 212 provides data scientists insights for model comparison and how to improve efficacy (e.g., data quality). FIGS. 10 and 14 illustrate example post-process visualizations generated by the example post-process visualization circuitry 212.

Thus, the example pre-process visualization circuitry 208, the example in-process visualization circuitry 210, and the example post-process visualization circuitry 212 form a framework for providing visualizations (e.g., visualizations of ML-based malware detection pipelines). The example pre-process visualization circuitry 208 generates a distribution-based visualization on test data. The example in-process visualization circuitry 210 generates a model-based XAI visualization to show feature importance in decision making (e.g., using SHAP and/or Grad-CAM, etc.) and a feature projection visualization (e.g., t-SNE, PCA, etc.). The example post-process visualization circuitry 212 generates visualizations for interpretability in evaluation metrics (e.g., ROC analysis). In other words, a three-part XAI framework defined by example pre-process visualization circuitry 208, the example in-process visualization circuitry 210, and the example post-process visualization circuitry 212, provides end-to-end transparency, visualization, explanations, and recommendations for a ML pipeline. The three-part XAI framework described herein can help researchers identify the failure modes for error analysis and model comparison. In some examples, the XAI framework provides a recommendation to a user along with visualizations. The example bus 216 allows for communication between the various parts of the three-part XAI framework (e.g., and other members of the XAI circuitry 102). The example data storage 214 may store visualizations, test data, classification results, and any other data required by parts of the XAI circuitry 102.

Figure 3:
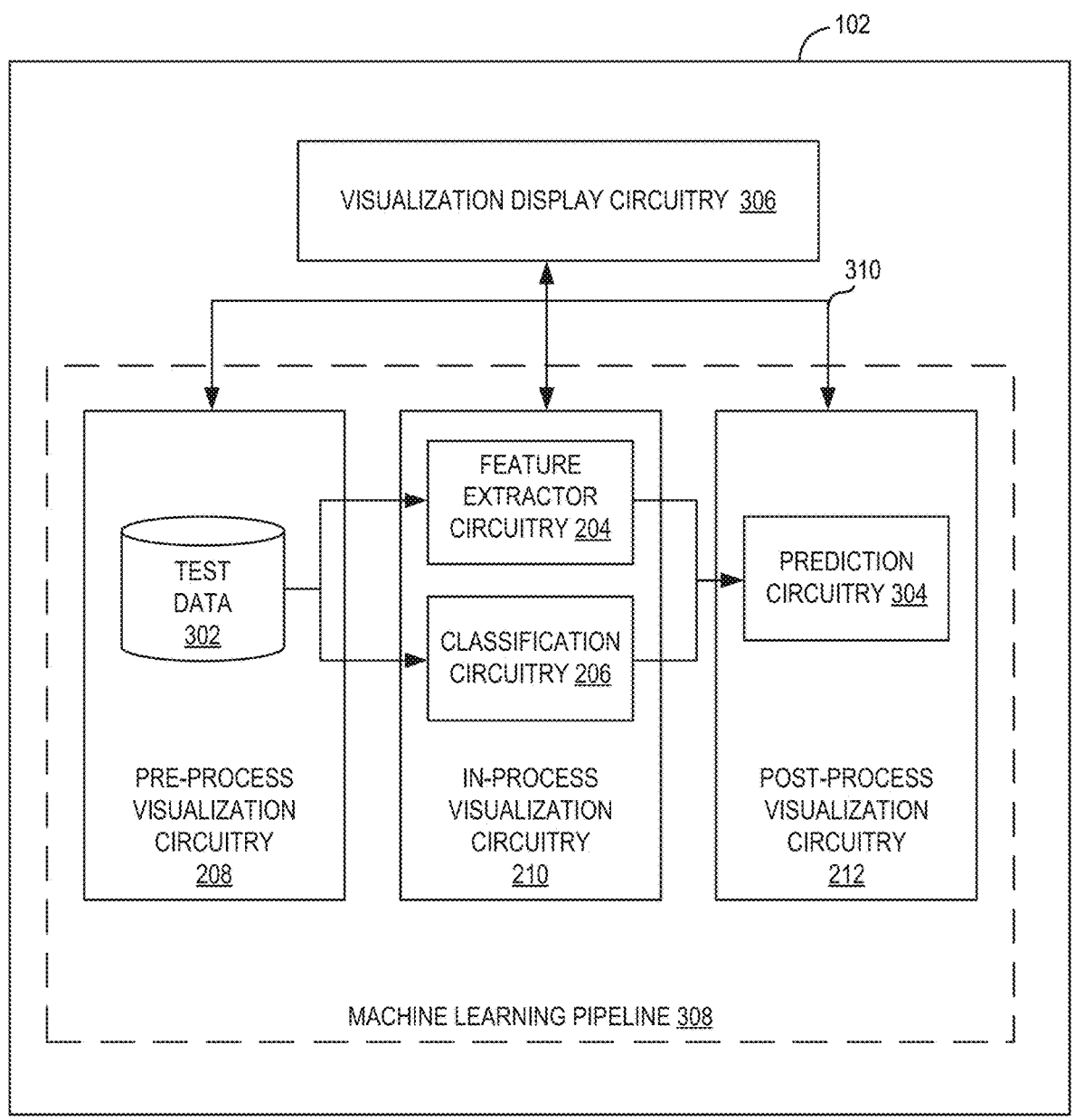
FIG. 3 is another block diagram of explainable artificial intelligence circuitry of FIG. 1.

FIG. 3 is another block diagram of the example XAI circuitry 102 of FIG. 1. In the example of FIG. 3, the XAI circuitry further includes example test data 302, example prediction circuitry 304, an example visualization display circuitry 306, and an example machine learning pipeline 308, and an example bus 310.

The example machine learning pipeline 308 performs inference on test data (e.g., predicting a file as malware or benign) through a three stage pipeline, as described in association with FIG. 2. The first stage of the machine learning pipeline 308 is a pre- processing phase in which the test data 302 is prepared and analyzed. The pre-process visualization circuitry 208 generates a visualization and the visualization is transmitted to the visualization display circuitry 306. The test data is transferred to the example feature extractor circuitry 204 and the example classification circuitry 206 for feature extraction and inference, respectively.

In some examples, the feature extractor circuitry 204 first extracts features, and the extracted features are then provided to the classification circuitry 206 for classification of a sample as malware or benign. The example in-process visualization circuitry 210 generates a second visualization based on features extracted from the test data 302 and provides the generated visualization to the visualization display circuitry 306. Classification results from the classification circuitry 206 are provided to the prediction circuitry 304.

The example prediction circuitry 304 retrieves classified results from the classification circuitry 206 and performs post-processing operations on the results, providing additional insights about the data that can be visualized and provided to the example visualization display circuitry 306. The example prediction circuitry 304 may, for example, quantify concept drift, identify model misclassifications, and/or evaluate customer escalations as related to the results generated by the classification circuitry 206. In some examples, the example prediction circuitry 304 can mitigate adversarial machine learning data evasion attacks by a comparison of the test data to classification results, combined with additional historical malware detection data (e.g., stored and/or retrieved from the data storage 214 of FIG. 2). The visualization display circuitry 306 may combine one or more of the visualizations from any of the pre-process visualization circuitry 208, the in-process visualization circuitry 210, and/or the post-process visualization circuitry 212 to provide a ML-pipeline level visualization along with associated insights and optimization recommendations.

FIG. 4 is a block diagram of the example in-process visualization circuitry 210 shown in FIG. 2. The example in-process visualization circuitry 210 includes feature extractor visualization selecting circuitry 402, example classification visualization selecting circuitry 404, example principal component analysis visualization circuitry 406, example t-distributed stochastic neighbor embedding (t-SNE) visualization circuitry 408, example transparent model visualization circuitry 410, example tree-based model visualization circuitry 412 and example neural network-based visualization circuitry 414. A first example bus 416 of FIG. 4 couples the feature extractor visualization selecting circuitry 402, the example principal component analysis visualization circuitry 406, and the example t-SNE visualization circuitry 408. A second example bus 418 of FIG. 4 couples the example transparent model visualization circuitry 410, the example tree-based model visualization circuitry 412 and the example neural network-based visualization circuitry 414.

The example in-process visualization circuitry 210 includes the example feature extractor visualization selecting circuitry 402. The feature extractor visualization selecting circuitry 402 determines which type of feature extraction is performed on the test data by analyzing information provided by the example feature extractor circuitry 204. If the feature extractor visualization selecting circuitry 402 determines that a PCA is being performed on the test data 302 by the example feature extractor circuitry 204, the feature extractor visualization selecting circuitry 402 retrieves data from the PCA operations and provides that information to the example PCA visualization circuitry 406. The example PCA component analysis visualization circuitry 406 performs a visualization on the retrieved data. For example, the PCA visualization circuitry may visualize clusters of features of malware test data, the samples based on a singular value decomposition of the test data projected to a lower-dimensional space.

The example feature extractor visualization selecting circuitry 402 may determine that feature extraction is performed based on a t-SNE. The example feature extractor visualization selecting circuitry 402 may then retrieve data from the machine learning pipeline and provide the retrieved data to the example t-SNE visualization circuitry 408. For example, the t-SNE visualization circuitry 408 may provide before and after probability distribution visualizations of test data in a higher-dimensional space (e.g., before t-SNE) and a lower-dimensional space (e.g., after t-SNE).

The example classification visualization selecting circuitry 404 receives information from the example classification circuitry 206 and determines a type of model used for classification by the example classification circuitry 206. If the example classification visualization selecting circuitry 404 determines that a transparent machine learning model (e.g., a logistic regression model) is used by the classification circuitry 206, the example classification visualization selecting circuitry 404 transmits classification data and/or data related to the machine learning model to the transparent model visualization circuitry 410. The transparent model visualization circuitry 410 generates a visualization for a transparent model (e.g., a white box model). Transparent models are already relatively human-understandable without extra processing. Therefore, the transparent model visualization circuitry 410 can, in some examples, generate a visualization wherein the visualization is tightly coupled to the model (e.g., a plot of a logistic regression curve).

If the example classification visualization selecting circuitry 404 determines that a tree-based model (e.g., a decision tree) is used by the classification circuitry 206, the example classification visualization selecting circuitry 404 transmits classification data and/or data related to the machine learning model to the tree-based model visualization circuitry 412. For example, the tree-based model visualization circuitry 412 may generate a visualization for the tree-based models (e.g., random forests) on SHAP. Tree-based model visualizations may also use the XGboot, and lightGBM algorithms.

If the example classification visualization selecting circuitry 404 determines that a neural network-based model (e.g., convolutional NNs and recurrent NNs) is used by the classification circuitry 206, the example classification visualization selecting circuitry 404 transmits classification data and/or data related to the machine learning model to neural network-based visualization circuitry 414. The neural network-based visualization circuitry 414 may generate a visualization based on a gradient-weighted class activation mapping (Grad-CAM) that visualizes features flowing into a final convolutional layer of the model and emphasize various regions in the map.

FIG. 5 illustrates example tables and data associated with example malware classification misses and example model sensitivity thresholds. FIG. 5 includes an example first table 500 and an example second table 502. The example first table 500 shows data for four misses for an example anti-virus classification test. The four misses are indexed 0 to 3. The first table 500 includes a UUID identifier, a file type, and a classification score for each sample. For example, the table 500 includes a sample 504 with a classification score of 2.52690.

The second table 502 shows model thresholds (e.g., $\Theta$ values) for low, medium, and high sensitivities. The second table 502 is associated with the data of the first table 500. For example, the sample 504 would be detected as malware when the model is at a high sensitivity (e.g., high $\Theta$), as the classification score of 2.526290 is greater than the threshold of 1.223103 for the corresponding file type (e.g., portable executable).

Figure 6:
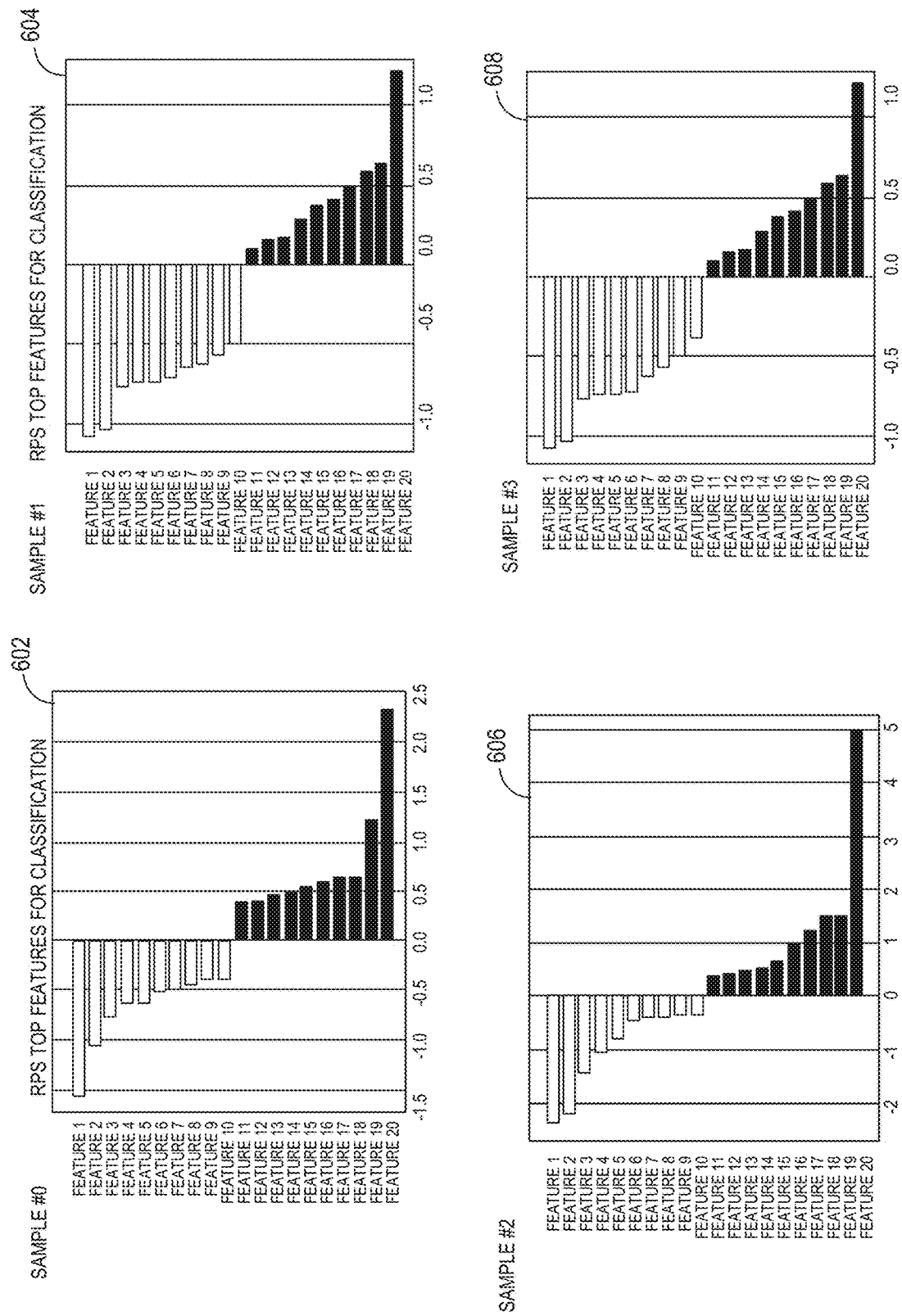
FIG. 6 is an example in-process visualization of logistic regression model decisions for the malware classification misses of FIG. 5.

FIG. 6 is an example in-process visualization of logistic regression model decisions for the four malware classification misses of FIG. 5. The example in-process visualization of FIG. 6 includes an example first logistic decision model visualization 602, an example second logistic decision model visualization 604, an example third logistic decision model visualization 606, and an example fourth logistic decision model visualization 608. The example first visualization 602 corresponds to the sample of index 0 in the table 500 of FIG. 5. Each visualization includes a score (x-axis value) for a given feature (y-axis category). A score (x-axis value) of less than zero indicates a benign score for that feature. A score (x-axis value) of greater than zero indicates a malware score for that feature. In each of the visualizations, a determination of whether a sample is benign or malware is obtained by summing all the values in the respective visualization. The summation is then compared to the corresponding threshold value (e.g., a corresponding $\Theta$ of FIG. 5) to make a final classification of whether a sample is malware or benign.

For example, for the first visualization 602 and the third visualization 606, the sum of the values that are less than zero are greater than the sum of the values that are greater than zero. Therefore, the example first visualization 602 and the example third visualization 606 do not surpass the corresponding threshold value (e.g., corresponding Θ) and are classified as benign.

FIG. 7 is an example pre-process visualization for distributions of six file types for first and second machine learning models. FIG. 5 shows the distribution of six file types (PE, DOTNET, VC, VB, DELPHI, UPX) for a first example model 700 and a for a second example model 702.

Each row of visualizations includes visualized results associated with different file types. The first row includes the first graph 703 (e.g., PE file type), the second graph 704 (e.g., DOTNET file type), and the third graph 706 (e.g., VC file type). The second row includes the fourth graph 708 (e.g., VB file type), the fifth graph 710 (e.g., DELPHI file type), and the sixth graph 712 (e.g., UPX file type). The second model 702 includes graphs that correspond to the first model 700 in each respective position. (e.g., first graph 703 and seventh graph 714 are of the same file type, PE).

Each graph within FIG. 7 is a distribution of prediction scores that reflects a test data distribution. For example, the XAI circuitry 102 of FIG. 2 may establish a correlation between model performance and input data, identifying the test data (e.g., the test data distribution) as a root cause for insufficient model performance. Then, the example XAI circuitry 102 can generate a recommendation that identifies the test data as the root cause and avoids unnecessary changes to a machine learning model. As shown in FIG. 7, DOTNET and DELPHI, which correspond to the second graph 704 and the fifth graph 710, respectively, have different distributions. Analysis of differences in distributions between file types can benefit model comparison and allow the example XAI circuitry 102 of FIG. 2 to generate recommendations to improve model performance.

Figure 8:
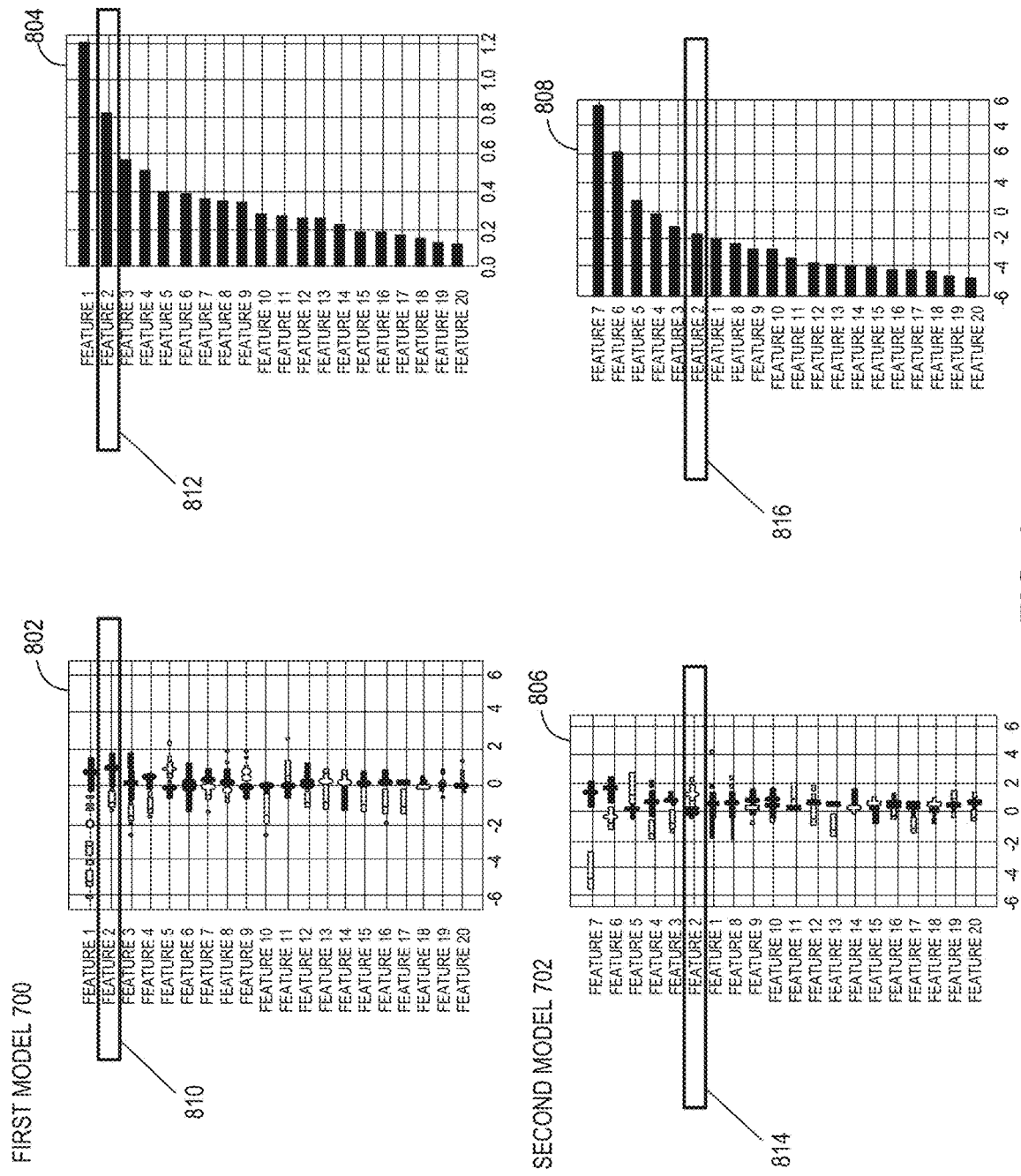
FIG. 8 is an example in-process visualization using shapley additive explanations.

FIG. 8 is an example in-process visualization using shapley additive explanations for the first model 700 and the second model 702 of FIG. 7. Plots 802 and 806 are beeswarm plots for the first model 702 and the second model 702, respectively. The first plot 802 and the second plot 806 provide visualizations of testing data. The example bar charts 804 and 808 illustrate feature importance. Example boxes 810-816 show the rankings of the "feature 2" feature is different between the first model 700 and the second model 702. In the visualizations, the boxes 810-816 provide a visual indicator to a user of an area of interest within the visualization.

Figure 9:
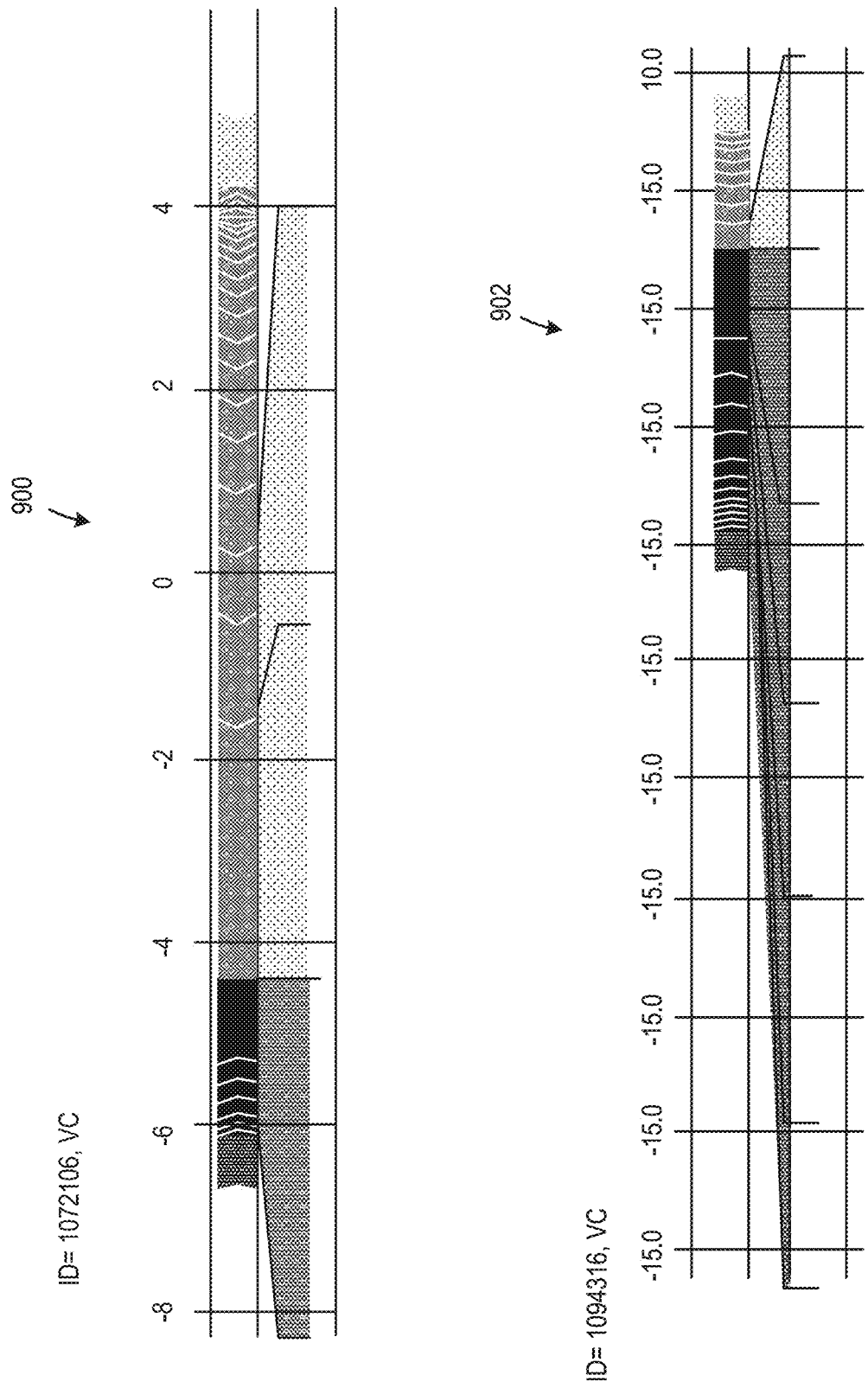
FIG. 9 is an example in-process visualization using shapley additive explanations for error analysis.

FIG. 9 is an example in-process visualization using shapley additive explanations for error analysis (e.g., FNs and FPs). The first plot 900 of FIG. 9 is one example of FNs and the second plot 902 of FIG. 9 is one example of FPs. In the plots 900 and 902, features with arrows pointing to the right contribute to malware and with arrows pointing to the left contribute to benign. The length of a feature bar indicates the weight of the feature. A negative SHAP value moves a model towards a benign classification, while a positive SHAP value moves the model towards a classification of malware.

FIG. 10 is an illustration of an example post-processing visualization to interpret ROC, troubleshot FPs, and understand a root cause of errors. The graph 1002 is an ROC for the file type DELPHI. Graph 1004 includes a circled portion 1012 with several steps (e.g., cliffs).

The graph 1004 is a scatter plot of a prediction score (e.g., probability score) indicating a prediction each sample is malware. In the graph 1014, the smaller (e.g., filled in) circles represent malware. The larger circles that are unfilled (e.g., circle 1014) represent benign samples. Each dot is associated with a prediction probability threshold in a ROC. Plot 1006 is a plot of the circled portion 1012 of graph 1002 that illustrates a false positive rate below the operation point 1016 of graph 1002. Plot 1008 is a graph of data from the circled portion 1012 that illustrates thresholds below the operation point 1016 of graph 1002. Plot 1010 is a graph of data from the circled portion 1012 of graph 1002 that illustrates true positive rate below the operation point 1016 of graph 1002.

Figure 11:
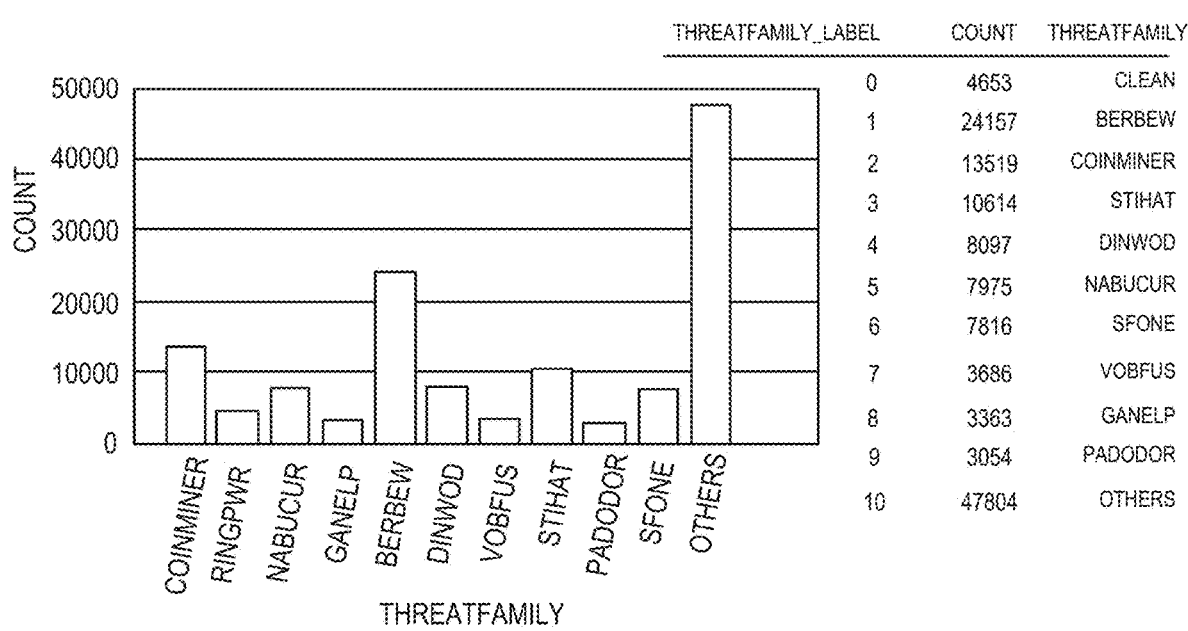
FIG. 11 is a data description for a convolutional neural network operating on raw bytes and an example pre-process visual explanation of malware prevalence.

FIG. 11 includes a data and model description 1100 for a convolutional neural network on raw bytes. FIG. 11 also includes an example pre-processing visual explanation of malware prevalence 1102. The graph 1102 illustrates a pre-processing visualization of data prevalence for ten malware families and clean samples. The graph 1102 can help a researcher efficiently understand test data for root cause analysis and/or comparison to other visualizations generated by the example XAI circuitry 102 of FIG. 2.

FIG. 12 shows an in-process visualization of two learning curves. The first learning curve 1200 is a loss function. The second learning curve 1202 is an accuracy (e.g., accuracy function). In some examples, the XAI circuitry 102 of FIG. 2 may use information from the learning curves to analyze if a model is overfit.

Figure 13:
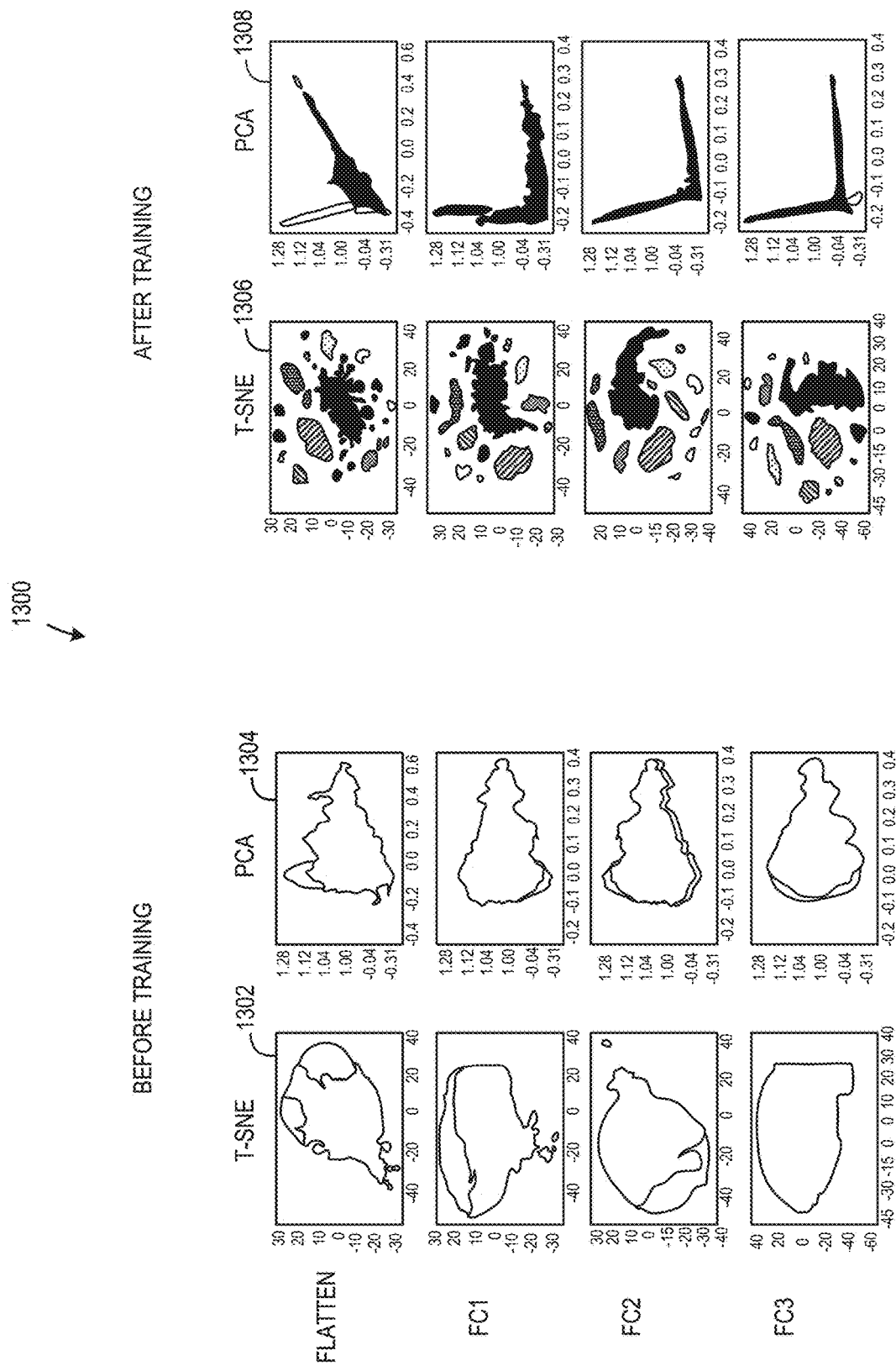
FIG. 13 shows an in-process visualization associated with t-distributed stochastic neighbor embedding and principal component analysis.

FIG. 13 shows an in-process visualization 1300 using t-distributed stochastic neighbor embedding and principal component analysis for before and after training. A comparison of the first graph 1302 to the third graph 1306 illustrates separation of the data points into visually identifiable clusters. A comparison of the second graph 1304 to the fourth graph 1308 illustrates visually identifiable principal components in the fourth graph 1308 that were not clearly visible before training in the second graph 1304. The visualizations of FIG. 13 illustrate that CNN training can effectively identify multi-family malware.

FIG. 14 is an example post-process visualization including test ROCs for model CNNs on raw bytes of different malware families. Each ROC curve (e.g., a first ROC curve 1402, a second ROC curve 1404) in the example ROC curve graph 1400 shows a tradeoff between true positive rate (TPR) and false positive rate (FPR). In the graph 1400, each ROC curve is associated with a malware family. The circles (e.g., circle 1406) are operating points points associated with the thresholds (e.g., user-selected threshold values). In the example graph 1400, a pAUC is area of the trapezoid under a curve from FPR=0 to an inflection point FPR (e.g., 0.0003).

Figure 15:
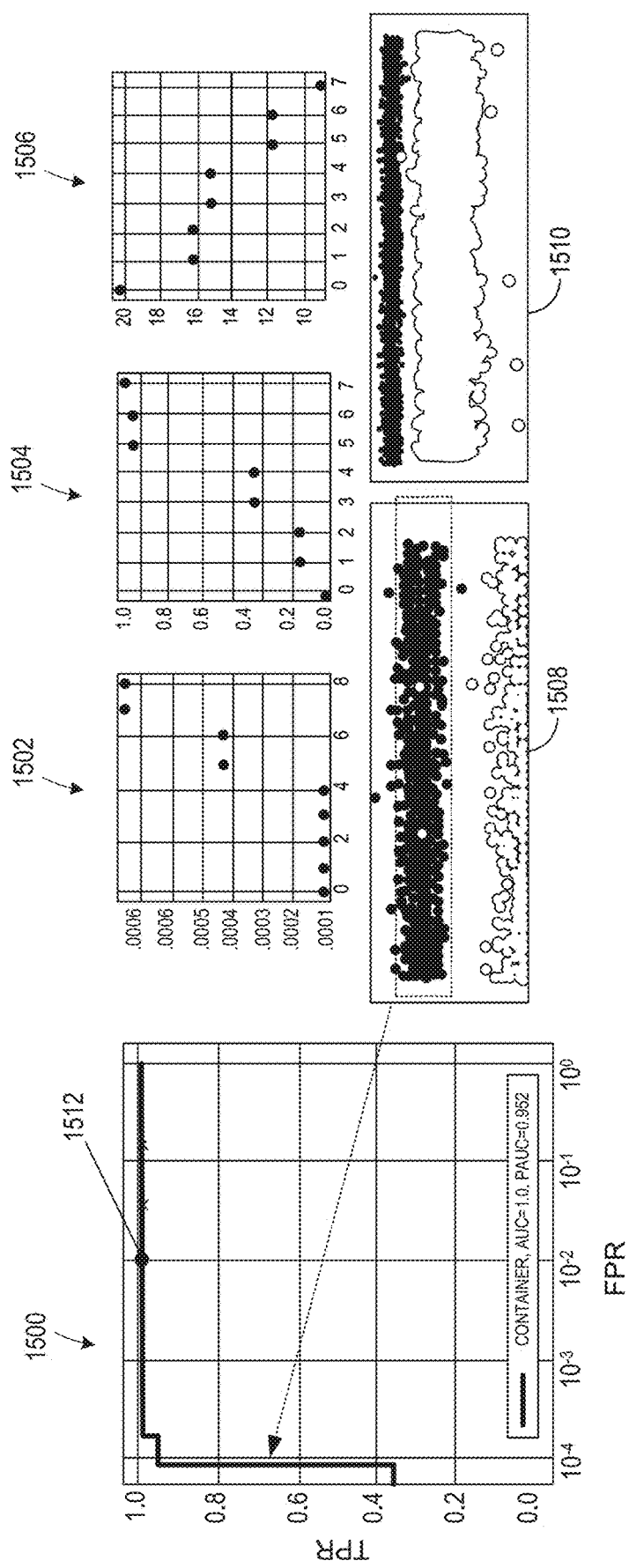
FIG. 15 illustrates another example post-processing visualization.

FIG. 15 is an example post-process visualization including receiver operating characteristic curves for convolutional neural networks associated with various malware families. The XAI circuitry 102 of FIG. 2 creates a visual explanation to interpret ROC, troubleshoot FPs, and understand root error causes. Plot 1500 is a ROC curve for one malware family. The plot 1500 includes several steps (e.g., cliffs).

The second plot 1508 is a scatter plot of prediction scores (e.g., probabilities) of each sample being malware or benign. The smaller (e.g., filled in) circles represent malware. The larger (e.g., unfilled) represent benign samples. The horizontal dashed lines in plot 1508 represent different thresholds, each of which is associated with a dot in a ROC. The plots 1502, 1504, and 1506 are FPR, threshold, and TPR for the ROC portion left of the operation point (e.g., left of dot 1512). The plots, when analyzed together, indicate a presence of polymorphic malware as the malware dots are in a very narrow probability band. Thus, the samples have similar patterns (e.g., raw bytes).

Each cliff on the ROC plot 1500 is associated with one FP (one benign dot with high prediction probability in the plot 1504) and more TPs (malware dots). Each cliff can be associated with several thresholds, and as illustrated in the plot 1510, there are relatively few benign dots.

Samples which contribute to discriminations and are near the decision boundary lead to improved performance. In addition, for a threshold associated with any given operating point, the example XAI circuitry 102 may recommend cliffs which give the more gain (e.g., more TPs) while reducing FPs. XAI information generated by the example XAI circuitry 102 of FIG. 2 can help security researchers and/or data scientists identify a root cause of the performance discrepancies across various ML models and develop improved solutions.

While an example manner of implementing the XAI circuitry 102 of FIG. 1 is illustrated in FIGS. 2-15, one or more of the elements, processes, and/or devices illustrated in FIGS. 2-15 may be combined, divided, re-arranged, omitted, eliminated, and/or implemented in any other way. Further, the example communication circuitry 202, the example feature extractor circuitry 204, the example classification circuitry 206, the example pre-process visualization circuitry 208, the example in-process visualization circuitry 210, the example post-process visualization circuitry 212, the example data storage 214, the bus 216 and/or, more generally, the example XAI circuitry 102 of FIG. 1, may be implemented by hardware alone or by hardware in combination with software and/or firmware. Thus, for example, any of the example communication circuitry 202, the example feature extractor circuitry 204, the example classification circuitry 206, the example pre-process visualization circuitry 208, the example in-process visualization circuitry 210, the example post-process visualization circuitry 212, the example data storage 214, the bus 216 and/or, more generally, the example XAI circuitry 102 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example XAI circuitry 102 of FIG. 1 may include one or more elements, processes, and/or devices in addition to, or instead of, those illustrated in FIGS. 2-15, and/or may include more than one of any or all of the illustrated elements, processes and devices.

Flowcharts representative of example hardware logic circuitry, machine readable instructions, hardware implemented state machines, and/or any combination thereof for implementing the XAI circuitry 102 is shown in FIGS. 16-19. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 16-19, many other methods of implementing the example XAI circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 16-19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 16:
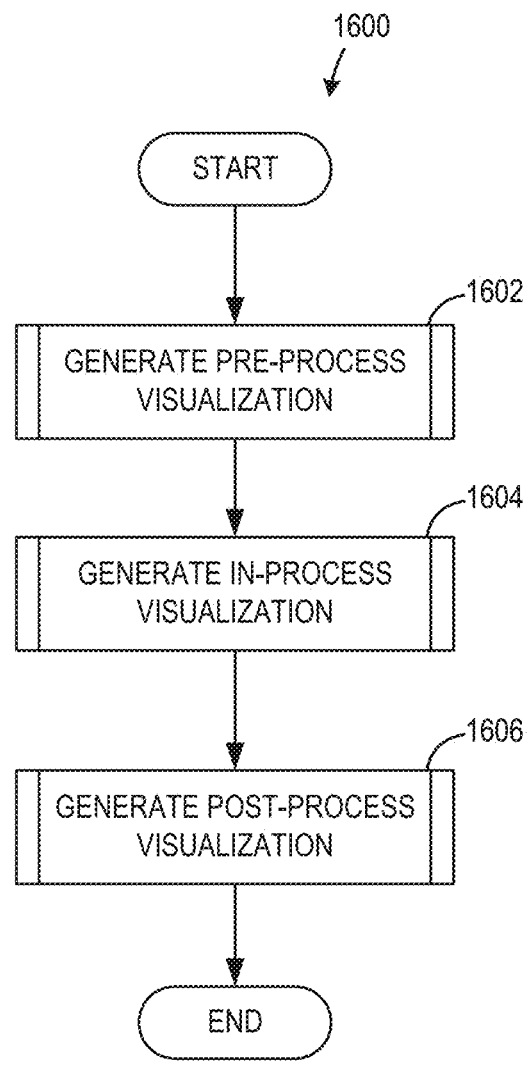
FIG. 16 is a flowchart representative of example machine readable instructions and/or example operations that may be executed by example processor circuitry to implement the example explainable artificial intelligence circuitry of FIG. 2.

FIG. 16 is a flowchart representative of example machine readable instructions and/or example operations 1600 that may be executed and/or instantiated by processor circuitry to visualize machine-learning based malware classification. The machine readable instructions and/or the operations 1600 of FIG. 16 begin at block 1602, at which the pre-process visualization circuitry 208 of FIG. 2 visualizes a pre-process portion of a machine learning pipeline. For example, the first visual explanation may be a first visualization of a distribution of test data (e.g., malware data) to help a user understand the distribution of test data. The instructions of block 1602 will be described in greater detail in association with FIG. 17.

At block 1604, the example in-process visualization circuitry 210 of FIG. 2 visualizes an in-process portion of a machine learning pipeline. For example, the in-process visualization circuitry 210 of FIG. 2 may visualize a relationship between feature ranking and model decision making. The visualization may include model interpretability information associated with model decision making in feature space and present class similarity for high dimensionality data The instructions of block 1604 will be described in greater detail in association with FIG. 18.

At block 1606, the example post-process visualization circuitry 212 of FIG. 2 generates a post-process visualization. For example, the post-process visualization circuitry 212 of FIG. 2 may generate a post-process visualization that includes a ROC curve and a pAUC curve. The pAUC summarizes a portion of the ROC curve over a specified interval of interest and can provide actionable results in examples where a ROC comparison between two models does not produce adequate results. The instructions of block 1606 are described in greater detail in association with FIG. 19.

Figure 17:
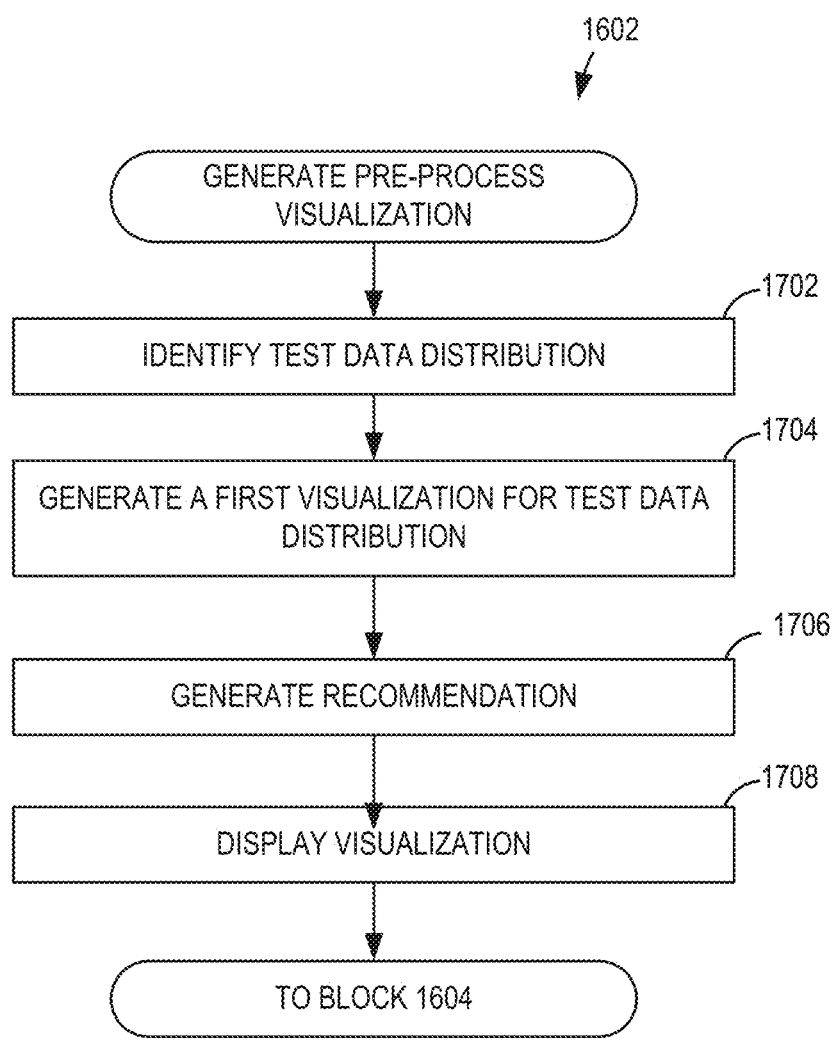
FIG. 17 is a flowchart representative of example machine readable instructions and/or example operations that may be executed by example processor circuitry to implement the example pre-process visualization circuitry of FIG. 2.

FIG. 17 is a flowchart representative of example machine readable instructions and/or example operations 1602 that may be executed and/or instantiated by processor circuitry to generate a pre-process visualization. The machine readable instructions and/or the operations 1602 of FIG. 17 begin at block 1702, at which the pre-process visualization circuitry 208 of FIG. 2 identifies test data distribution. For example, an analysis of differences in distributions between file types can allow the example XAI circuitry 102 of FIG. 2 to generate a recommendation(s) to improve model performance.

At block 1704, the example pre-process visualization circuitry 208 of FIG. 2 generates a first visualization for a test data distribution. For example, the first visualization may be a series of graphs, wherein each row of the first visualization includes visualized results associated with a different file type. In some examples, the first visualization may include an indication (e.g., a highlighted area of the visualization, a circled area of the visualization, etc.) that a data is an outlier data. Outlier data is data that is more distant (e.g., greater euclidian distance, greater manhattan distance, etc.) than a majority of from a center point of a data set. For example, a visualization may include a cluster of data (e.g., a cluster of inlier data), wherein values of the cluster are relatively close to each other (e.g., shorter distance between points in feature space than outlier data points). The visualization may also include outlier data (e.g., additional data point(s)) that are relatively far (e.g., greater euclidean distance, greater manhattan distance, etc., than inlier data points) from the cluster of data. Such outlier data may be emphasized (e.g., highlighted, circled, pointed to) in the visualization to draw attention to the outlier data.

At block 1706, the example pre-process visualization circuitry 208 of FIG. 2 generates a recommendation to adjust a machine learning model associated with the test data. For example, the first visualization may include a recommendation to reduce a malware classification error rate of the machine learning model by selecting a different ML model type.

At block 1708 the example visualization display circuitry 306 of FIG. 3 displays the first visualization. For example, the pre-process visualization circuitry 208 may transmit a generated visualization to the visualization display circuitry 306. The example visualization display circuitry 306 may, in response to receiving the first visualization, combine the first visualization with one or more additional visualizations before displaying the first visualization. The instructions continue at block 1604 of FIG. 16.

Figure 18:
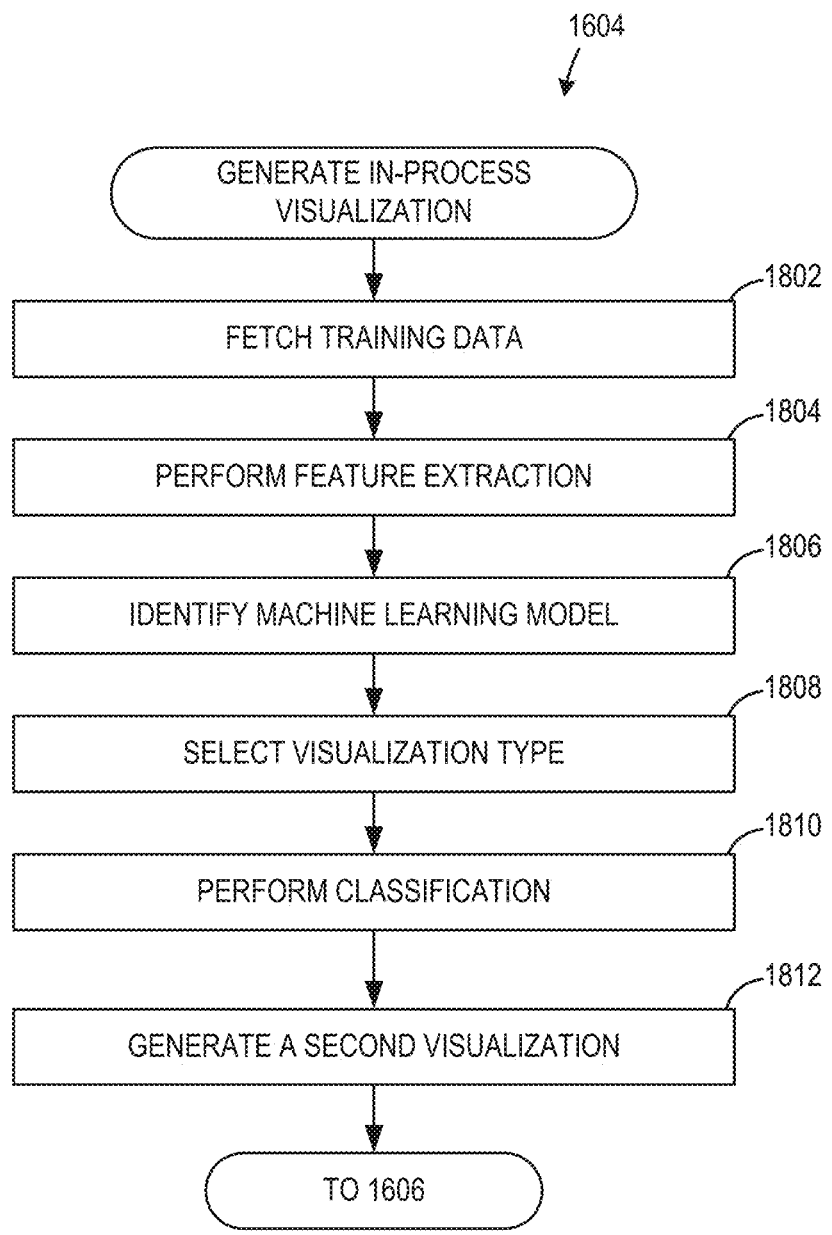
FIG. 18 is a flowchart representative of example machine readable instructions and/or example operations that may be executed by example processor circuitry to implement the example in-process visualization circuitry of FIG. 2.

FIG. 18 is a flowchart representative of example machine readable instructions and/or example operations 1604 that may be executed and/or instantiated by processor circuitry to generate an in-process visualization. The machine readable instructions and/or the operations 1604 of FIG. 18 begin at block 1802, at which the in-process visualization circuitry 210 fetches training data. For example, the in-process visualization circuitry 210 may fetch test data from the pre-process visualization circuitry 208 of FIG. 2.

At block 1804, the example feature extractor circuitry 204 of FIG. 2 extracts features from the test data 302 of FIG. 3. For example, the feature extractor circuitry 204 may reduce a number of features in a dataset by creating new features from existing features and discarding the existing features. A reduced set of features can summarize the original features while facilitating generation of visualizations that are more understandable than higher dimensional visualizations.

At block 1806, the example classification circuitry 206 of FIG. 2 identifies a machine learning model. For example, the classification circuitry 206 of FIG. 2 may identify the type of machine learning model by identifying a model as one of: a tree-based model, a neural network-based model, or a regression-based model. Then, at block 1808, the example classification visualization selecting circuitry 404 of FIG. 4 selects a visualization type. The visualization type may be selected based on the type of the machine learning model. For example, the classification visualization selecting circuitry 404 of FIG. 4 may generate a visualization for a tree-based models based on SHAP and/or generate a visualization for a neural network-based model based on Grad-CAM.

At block 1810 the example classification circuitry 206 of FIG. 2 performs a classification. The example classification may include prediction of a class label for a given input data. For example, the classification may involve categorizing a series of bytes as malware or benign.

At block 1812, the example in-process visualization circuitry 210 of FIG. 2 generates a second visualization. For example, the in-process visualization circuitry 210 of FIG. 2 may generate a second visualization that includes ranked feature importance and an indicator of differences in feature ranking between two machine learning models. The second visualization may also include a recommendation to improve inference accuracy based on a comparison of information from first visualization and the second visualization. The instructions continue at block 1606 of FIG. 16.

Figure 19:
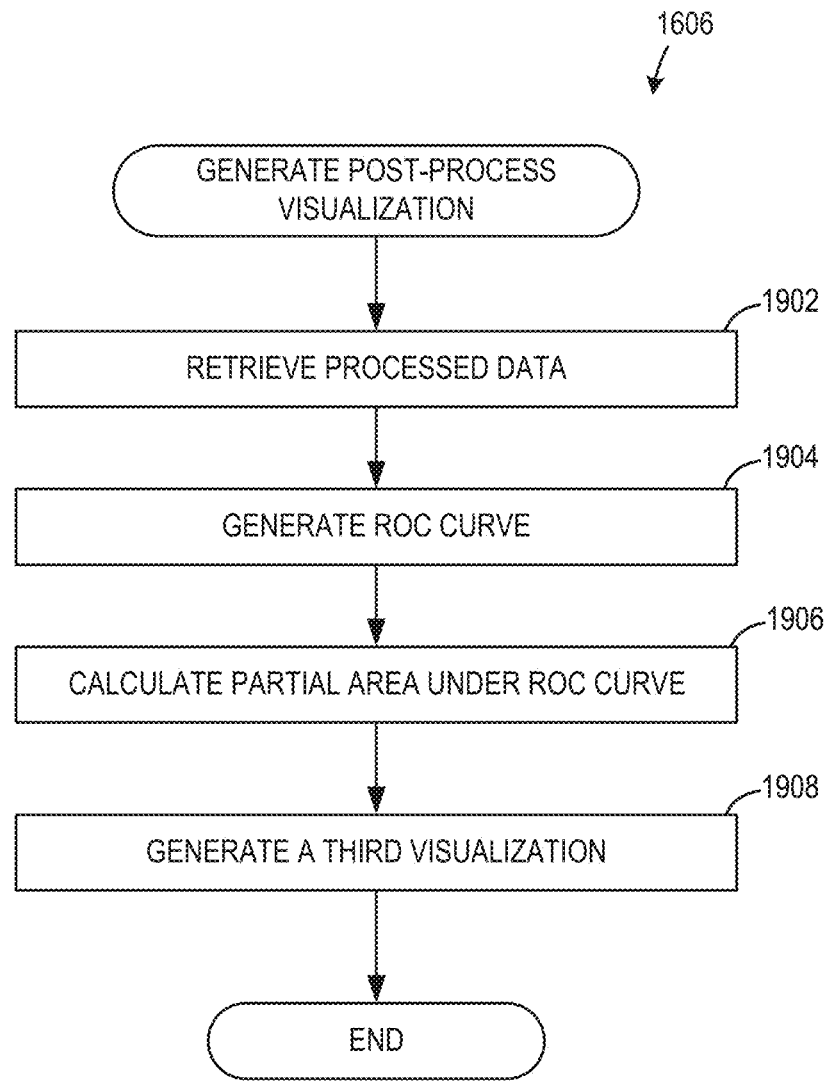
FIG. 19 is a flowchart representative of example machine readable instructions and/or example operations that may be executed by example processor circuitry to implement the example post-process visualization circuitry of FIG. 2.

FIG. 19 is a flowchart representative of example machine readable instructions and/or example operations 1606 that may be executed and/or instantiated by processor circuitry to generate a post-process visualization. The machine readable instructions and/or the operations 1606 of FIG. 19 begin at block 1902, at which the prediction circuitry 304 of FIG. 3 and/or the example post-process visualization circuitry 212 of FIG. 2 retrieves processed data. For example, the prediction circuitry 304 of FIG. 3 may retrieve classification results from the example classification circuitry 206 of FIG. 2. The prediction circuitry 304 of FIG. 3 may use the classification results to generate a post-process visualization (e.g., a third visualization).

At block 1904, the example post-process visualization circuitry 212 of FIG. 2 generates a ROC curve. The example ROC curve illustrates performance (e.g., TPR vs FPR) of a classification model across classification thresholds. In some examples, the post-process visualization circuitry 212 may generate an indication of a classification threshold of interest and include the indication in a visualization that includes the ROC curve.

At block 1906, the example post-process visualization circuitry 212 of FIG. 2 calculates a partial area under the ROC curve (pAUC). The pAUC summarizes a portion of the ROC curve over a specified interval of interest and can provide actionable results in examples where a ROC comparison between two models does not produce adequate results. Then, at block 1908, the example post-process visualization circuitry 212 of FIG. 2 generates a third visualization. The third visualization may include the receiver operating characteristic curve and an indication of a partial area under the ROC curve. The third visualization may be provided to the visualization display circuitry 306 of FIG. 3, which may generate a pipeline level visualization that includes one or more of the first visualization, the second visualization, and/or the third visualization. The instructions end.

Figure 20:
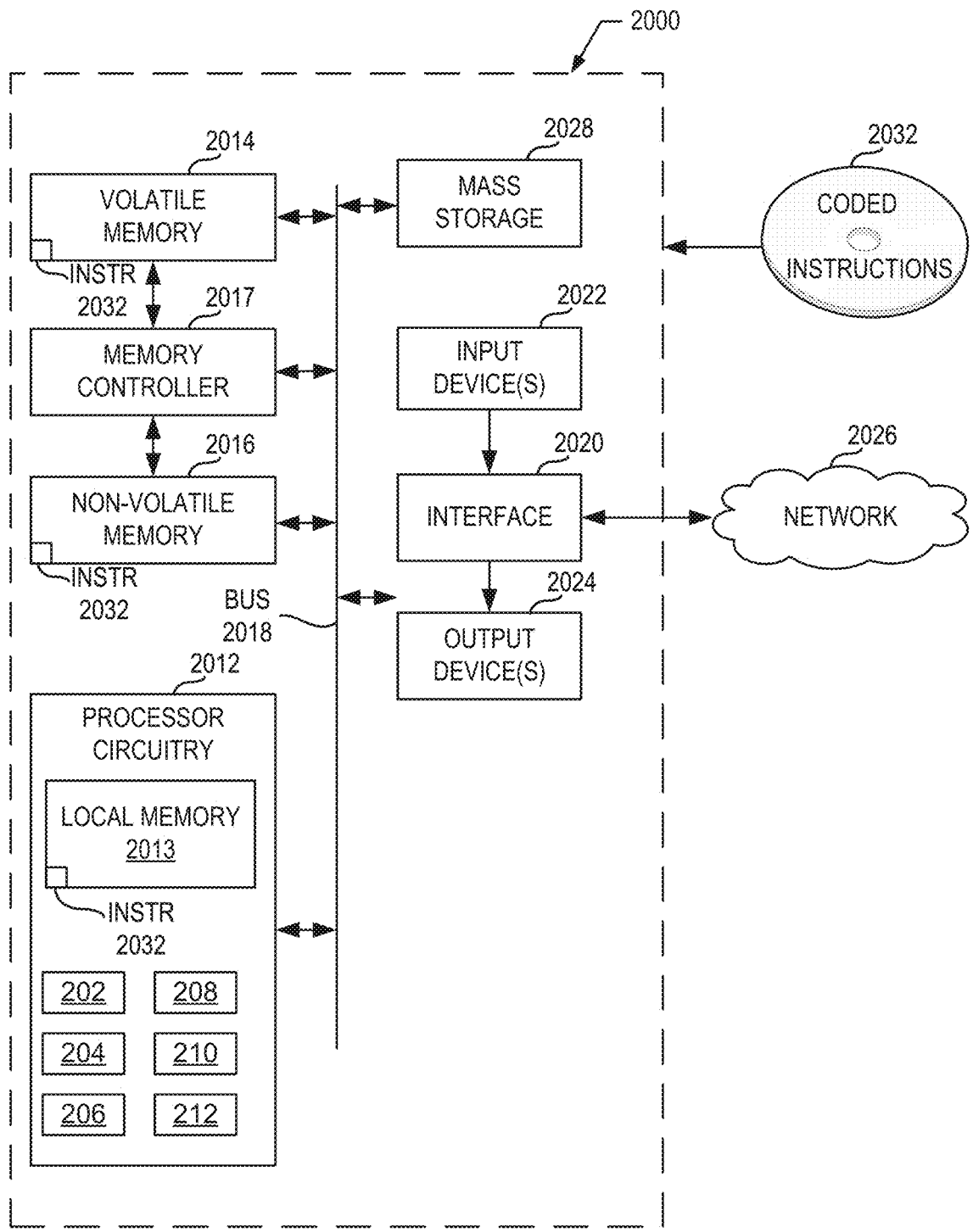
FIG. 20 is a block diagram of an example processing platform including processor circuitry structured to execute the example machine readable instructions and/or the example operations of FIGS. 16-19 to implement the example machine learning server of FIG. 2.

FIG. 20 is a block diagram of an example processor platform 2000 structured to execute and/or instantiate the machine readable instructions and/or the operations of FIGS. 16-19 to implement the XAI circuitry 102 of FIG. 2 The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) devices. In this example, the processor circuitry 2012 implements the example communication circuitry 202, the example feature extractor circuitry 204, the example classification circuitry 206, the example pre-process visualization circuitry 208, the example in-process visualization circuitry 210, the example post-process visualization circuitry 212, and the example data storage 214.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2022 are connected to the interface circuitry 2020. The input device(s) 2022 permit(s) a user to enter data and/or commands into the processor circuitry 2012. The input device(s) 2022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuitry 2020 of the illustrated example. The output device(s) 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 2032, which may be implemented by the machine readable instructions of FIGS. 16-19, may be stored in the mass storage device 2028, in the volatile memory 2014, in the non-volatile memory 2016, and/or on a removable non-transitory computer readable storage medium such as a CD or DVD.

Figure 21:
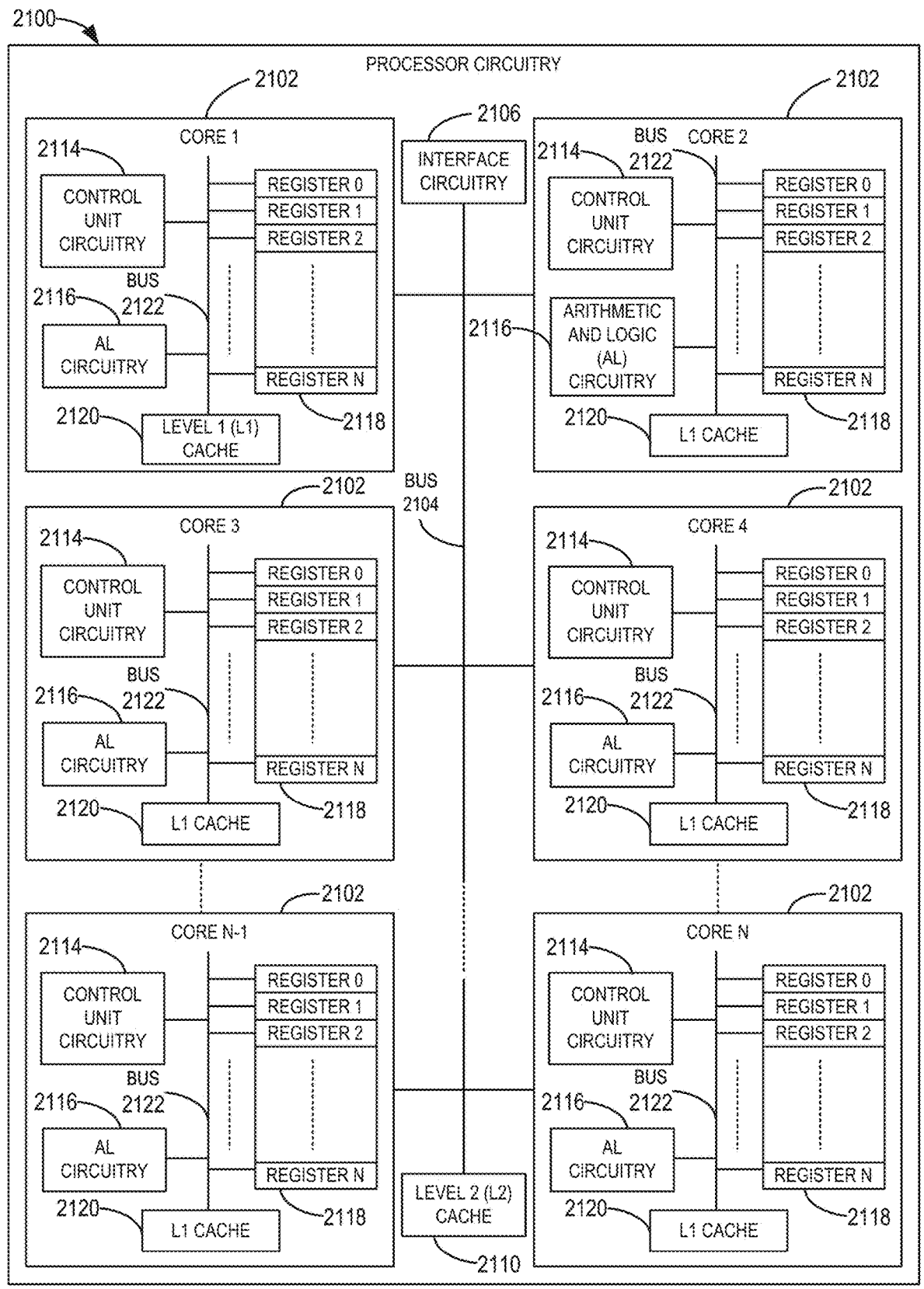
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a general purpose microprocessor 2100. The general purpose microprocessor circuitry 2100 executes some or all of the machine readable instructions of the flowchart of FIGS. 16-20 to effectively instantiate the circuitry of FIG. 2 as logic circuits to perform the operations corresponding to those machine readable instructions. In some such examples, the circuitry of FIG. 2 is instantiated by the hardware circuits of the microprocessor 2100 in combination with the instructions. For example, the microprocessor 2100 may implement multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowchart of FIGS. 16-20.

The cores 2102 may communicate by a first example bus 2104. In some examples, the first bus 2104 may implement a communication bus to effectuate communication associated with one(s) of the cores 2102. For example, the first bus 2104 may implement at least one of an Inter-Integrated Circuit (I2C) bus, a Serial Peripheral Interface (SPI) bus, a PCI bus, or a PCIe bus. Additionally or alternatively, the first bus 2104 may implement any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2 cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the L1 cache 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The second bus 2122 may implement at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
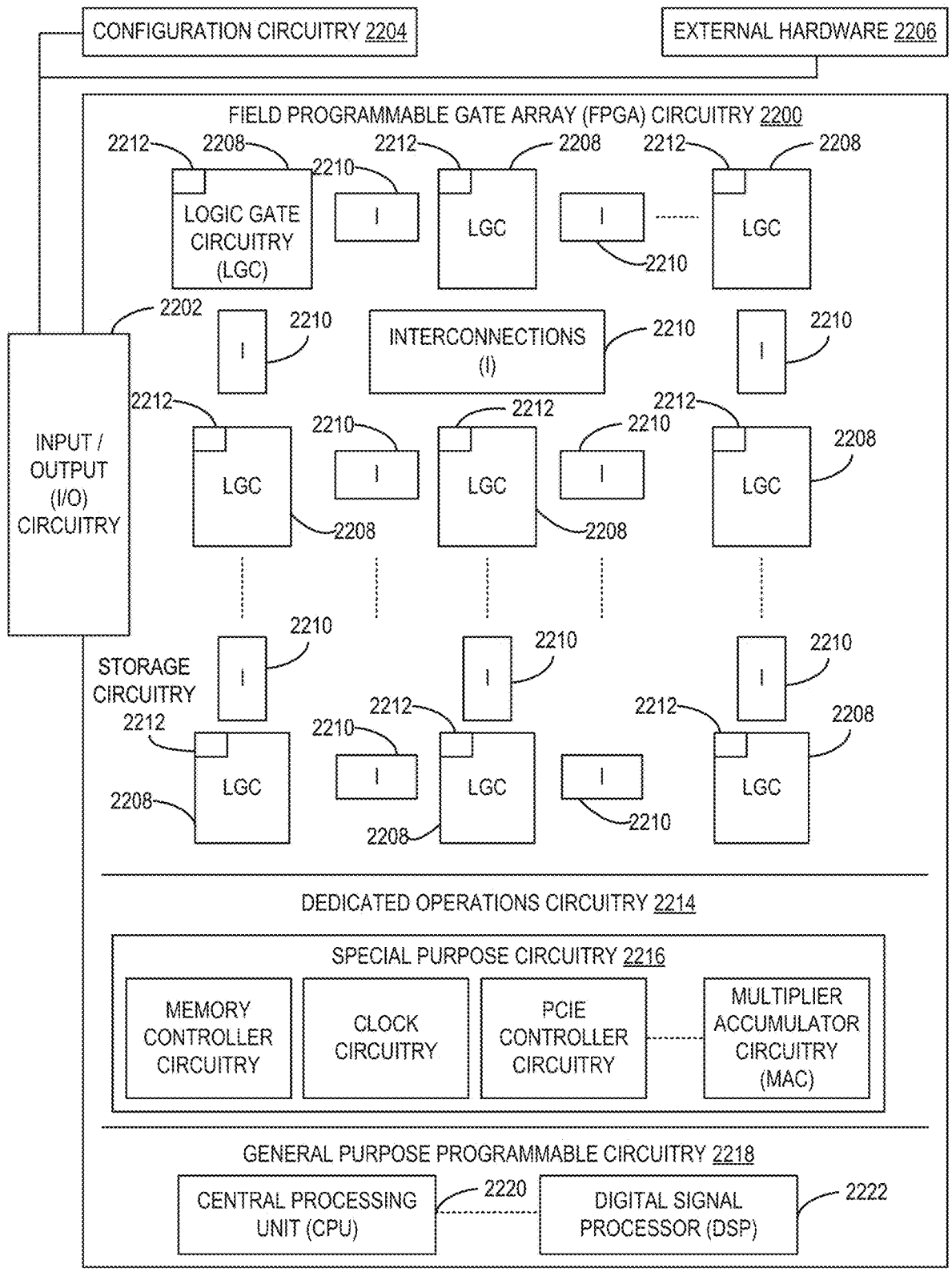
FIG. 22 is a block diagram of another example implementation of the processor circuitry of FIG. 20.

FIG. 22 is a block diagram of another example implementation of the processor circuitry 2012 of FIG. 20. In this example, the processor circuitry 2012 is implemented by FPGA circuitry 2200. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowcharts of FIG. 16-19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowcharts of FIG. 16-19. In particular, the FPGA 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowchart of FIGS. 16-19. As such, the FPGA circuitry 2200 may be structured to effectively instantiate some or all of the machine readable instructions of the flowchart of FIGS. 16-19 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIGS. 16-19 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware (e.g., external hardware circuitry) 2206. For example, the configuration circuitry 2204 may implement interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may implement the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and interconnections 2210 are configurable to instantiate one or more operations that may correspond to at least some of the machine readable instructions of FIGS. 16-19 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions represented by the flowchart of FIGS. 16-19 may be executed by one or more of the cores 2102 of FIG. 21, a second portion of the machine readable instructions represented by the flowcharts of FIGS. 16-19 may be executed by the FPGA circuitry 2200 of FIG. 22, and/or a third portion of the machine readable instructions represented by the flowcharts of FIGS. 16-19 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 2012 of FIG. 20 may be in one or more packages. For example, the processor circuitry 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
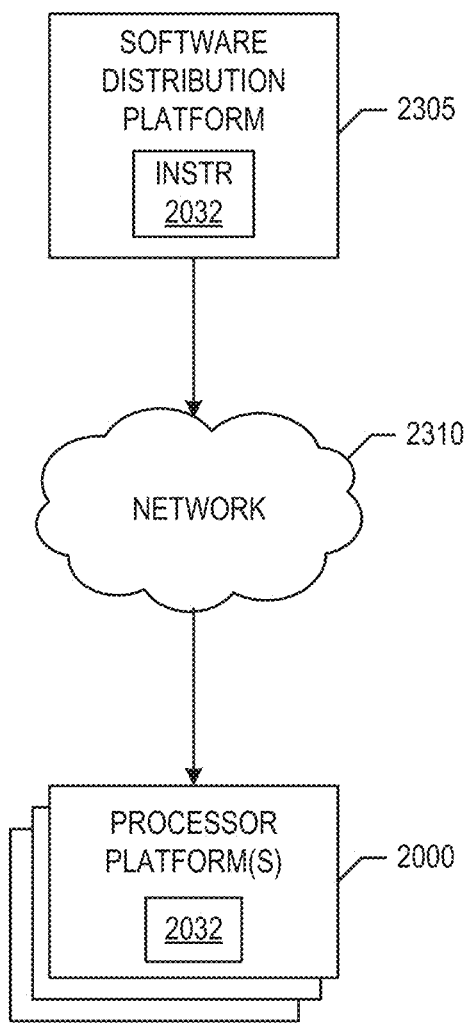
FIG. 23 is a block diagram of an example software distribution platform (e.g., one or more servers) to distribute software (e.g., software corresponding to the example machine readable instructions of FIGS. 16-19 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine readable instructions 2032, which may correspond to the example machine readable instructions 1600 of FIGS. 16-19, as described above. The one or more servers of the example software distribution platform 2305 are in communication with a network 2310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2032 from the software distribution platform 2305. For example, the software, which may correspond to the example machine readable instructions 1600 of FIGS. 16-19, may be downloaded to the example processor platform 2000, which is to execute the machine readable instructions 2032 to implement the XAI circuitry 102 of FIG. 2. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

From the foregoing, it will be appreciated that example systems, methods, apparatus, and articles of manufacture have been disclosed that visualize machine-learning based malware classification. Disclosed systems, methods, apparatus, and articles of manufacture improve the efficiency of using a computing device by providing improved visualization of machine learning pipelines. Examples disclosed herein generate improved visualizations for ML processes and provide recommendations to improve said processes. Through a visual explanation framework including pre-process visualizations, in-process visualizations, and post-process visualizations, computers can more effectively perform inference on ML models. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to visualize machine learning based malware classification are disclosed herein. Further examples and combinations thereof include the following:

Example 1 includes an apparatus comprising at least one memory, instructions, and processor circuitry to execute the instructions to identify a test data distribution, generate a first visualization of the identified test data distribution, select a visualization type for a machine learning model, generate a second visualization including an indication of features extracted from the test data by the machine learning model, and generate a third visualization of results of inference performed by the machine learning model, the inference performed on the test data.

Example 2 includes the apparatus of any of the previous examples, wherein the inference is at least one of a classification of a sample as malware or a classification of the sample as benign.

Example 3 includes the apparatus of any of the previous examples, wherein the processor circuitry is to generate a recommendation to improve inference accuracy based on a comparison of at least two of the first visualization, the second visualization, or the third visualization.

Example 4 includes the apparatus of any of the previous examples, wherein the processor circuitry is to generate a fourth visualization of the machine learning pipeline, the fourth visualization including the first visualization, the second visualization, and the third visualization.

Example 5 includes the apparatus of any of the previous examples, wherein at least one of the first visualization, the second visualization, and the third visualization includes an indication that a data is an outlier data.

Example 6 includes the method of any of the previous examples, wherein the first visualization includes a recommendation to reduce a malware classification error rate of the machine learning model.

Example 7 includes the method of any of the previous examples, wherein the third visualization includes a receiver operating characteristic curve and an indication of a partial area under the ROC curve.

Example 8 includes a computer readable medium comprising instructions which, when executed, cause processor circuitry to identify a test data distribution, generate a first visualization of the identified test data distribution, select a visualization type for a machine learning model, generate a second visualization including an indication of features extracted from the test data by the machine learning model, and generate a third visualization of results of inference performed by the machine learning model, the inference performed on the test data.

Example 9 includes the computer readable medium of any of the previous examples, wherein the inference is at least one of a classification of a sample as malware or a classification of the sample as benign.

Example 10 includes computer readable medium of any of the previous examples, wherein the instructions, when executed, cause the processor circuitry to generate a recommendation to improve inference accuracy based on a comparison of at least two of the first visualization, the second visualization, or the third visualization.

Example 11 includes the non-transitory computer readable medium of any of the previous examples, wherein the instructions, when executed, cause the processor circuitry to generate a fourth visualization of the machine learning pipeline, the fourth visualization including the first visualization, the second visualization, and the third visualization.

Example 12 includes the computer readable medium of any of the previous examples, wherein at least one of the first visualization, the second visualization, and the third visualization includes an indication that a data is an outlier data.

Example 13 includes the computer readable medium of any of the previous examples, wherein the first visualization includes a recommendation to reduce a malware classification error rate of the machine learning model.

Example 14 includes the computer readable medium of any of the previous examples, wherein the third visualization includes a receiver operating characteristic curve and an indication of a partial area under the ROC curve.

In any of examples 8 to 14, the computer readable medium may be a non-transitory computer readable medium.

Example 15 includes a method for error analysis in a machine learning pipeline, the method comprising identifying, by executing an instruction with processor circuitry, a test data distribution, generating, by executing an instruction with the processor circuitry, a first visualization of the identified test data distribution, selecting, by executing an instruction with processor circuitry, a visualization type for a machine learning model, generating, by executing an instruction with processor circuitry, a second visualization including an indication of features extracted from the test data by the machine learning model, and generating, by executing an instruction with processor circuitry, a third visualization of results of inference performed by the machine learning model, the inference performed on the test data.

Example 16 includes the method of any of the previous examples, wherein the inference is at least one of a classification of a sample as malware or a classification of the sample as benign.

Example 17 includes the method of any of the previous examples, further including generating a recommendation to improve inference accuracy based on a comparison of at least two of the first visualization, the second visualization, and the third visualization.

Example 18 includes the method of any of the previous examples, further including generating a fourth visualization of the machine learning pipeline, the fourth visualization including the first visualization, the second visualization, and the third visualization.

Example 19 includes the method of any of the previous examples, wherein at least one of the first visualization, the second visualization, and the third visualization includes an indication that a data is an outlier data.

Example 20 includes the method of any of the previous examples, wherein the first visualization includes a recommendation to reduce a malware classification error rate of the machine learning model.

Example 21 includes the method of any of the previous examples, wherein the third visualization includes a receiver operating characteristic curve and an indication of a partial area under the ROC curve.

It is noted that this patent claims priority from U.S. Provisional Patent Application No. 63/170,650, which was filed on Apr. 5, 2021, and is hereby incorporated by reference in its entirety.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine-readable instructions; and
   processor circuitry to execute the machine-readable instructions to:
   identify a distribution associated with test data;
   generate a first visualization of the identified distribution;
   generate a recommendation to adjust a machine learning model, the recommendation based on a classification error, the recommendation to be displayed with the first visualization, the recommendation to include an instruction to reduce a malware classification error of the machine learning model;
   select a visualization type for the machine learning model;
   generate a second visualization including an indication of features extracted from the test data by the machine learning model, the second visualization generated using gradient weighted class activation mapping t-distributed stochastic neighbor embedding feature projections; and
   generate a third visualization of results of an inference performed by the machine learning model, the inference performed on the test data, wherein the inference is at least one of a classification of a sample as malware or a classification of the sample as benign.

2. The apparatus of claim 1, wherein the processor circuitry is to generate a recommendation to improve inference accuracy based on a comparison of at least two of: the first visualization, the second visualization, or the third visualization.

3. The apparatus of claim 1, wherein the processor circuitry is to generate a fourth visualization of a machine learning pipeline, the fourth visualization including the first visualization, the second visualization, and the third visualization.

4. The apparatus of claim 1, wherein at least one of the first visualization, the second visualization, and the third visualization includes an indication that a data is an outlier data.

5. The apparatus of claim 1, wherein the third visualization includes a receiver operating characteristic curve and an indication of a partial area under the receiver operating characteristic curve.

6. A non-transitory computer readable medium comprising instructions which, when executed, cause processor circuitry to:
   identify a distribution associated with test data;
   generate a first visualization of the identified distribution;
   generate a recommendation to adjust a machine learning model, the recommendation based on a classification error, the recommendation to be displayed with the first visualization, the recommendation to include an instruction to reduce a malware classification error of the machine learning model;
   select a visualization type for the machine learning model;
   generate a second visualization including an indication of features extracted from the test data by the machine learning model, the second visualization generated using t-distributed stochastic neighbor embedding feature projections; and
   generate a third visualization of results of an inference performed by the machine learning model, the inference performed on the test data, wherein the inference is at least one of a classification of a sample as malware or a classification of the sample as benign.

7. The non-transitory computer readable medium of claim 6, wherein the instructions, when executed, cause the processor circuitry to generate a recommendation to improve inference accuracy based on a comparison of at least two of: the first visualization, the second visualization, or the third visualization.

8. The non-transitory computer readable medium of claim 6, wherein the instructions, when executed, cause the processor circuitry to generate a fourth visualization of a machine learning pipeline, the fourth visualization including the first visualization, the second visualization, and the third visualization.

9. The non-transitory computer readable medium of claim 6, wherein at least one of the first visualization, the second visualization, and the third visualization includes an indication that a data is an outlier data.

10. The non-transitory computer readable medium of claim 6, wherein the third visualization includes a receiver operating characteristic curve and an indication of a partial area under the receiver operating characteristic curve.

11. A method for error analysis in a machine learning pipeline, the method comprising:
    identifying, by executing an instruction with processor circuitry, a distribution associated with test data;
    generating, by executing an instruction with the processor circuitry, a first visualization of the identified distribution;
    generating, by executing an instruction with the processor circuitry, a recommendation to adjust a machine learning model, the recommendation based on a classification error, the recommendation to be displayed with the first visualization, the recommendation to include an instruction to reduce a malware classification error of the machine learning model;
    selecting, by executing an instruction with processor circuitry, a visualization type for the machine learning model;
    generating, by executing an instruction with processor circuitry, a second visualization including an indication of features extracted from the test data by the machine learning model, the second visualization generated using t-distributed stochastic neighbor embedding feature projections; and
    generating, by executing an instruction with processor circuitry, a third visualization of results of an inference performed by the machine learning model, the inference performed on the test data, wherein the inference is at least one of a classification of a sample as malware or a classification of the sample as benign.

12. The method of claim 11, further including generating a recommendation to improve inference accuracy based on a comparison of at least two of: the first visualization, the second visualization, and the third visualization.

13. The method of claim 11, further including generating a fourth visualization of the machine learning pipeline, the fourth visualization including the first visualization, the second visualization, and the third visualization.

14. The method of claim 11, wherein at least one of the first visualization, the second visualization, and the third visualization includes an indication that a data is an outlier data.

15. The method of claim 11, wherein the third visualization includes a receiver operating characteristic curve and an indication of a partial area under the receiver operating characteristic curve.

\* \* \* \* \*